United States Patent
Guntert, Jr. et al.

(10) Patent No.: US 9,908,571 B2
(45) Date of Patent: Mar. 6, 2018

(54) ADJUSTABLE BOLSTER SWING LEGS FOR SLIPFORM PAVING MACHINES

(71) Applicant: GUNTERT & ZIMMERMAN CONST. DIV., INC., Ripon, CA (US)

(72) Inventors: Ronald M. Guntert, Jr., Stockton, CA (US); Gerald L. Dahlinger, Ripon, CA (US); Richard Wood Francis, Stockton, CA (US)

(73) Assignee: Guntert & Zimmerman Const. Div., Inc., Ripon, CA (US)

( * ) Notice: Subject to any disclaimer, the term of this patent is extended or adjusted under 35 U.S.C. 154(b) by 0 days.

(21) Appl. No.: 15/623,012

(22) Filed: Jun. 14, 2017

(65) Prior Publication Data

US 2017/0282983 A1     Oct. 5, 2017

Related U.S. Application Data

(63) Continuation-in-part of application No. 15/148,811, filed on May 6, 2016, which is a continuation of
(Continued)

(51) Int. Cl.
*B62D 55/084* (2006.01)
*E01C 19/48* (2006.01)
(Continued)

(52) U.S. Cl.
CPC ............ *B62D 55/084* (2013.01); *B62D 7/06* (2013.01); *B62D 11/20* (2013.01); *B62D 55/065* (2013.01);
(Continued)

(58) Field of Classification Search
CPC .......... B62D 7/06; B62D 11/02; B62D 11/20; B62D 55/0655; B62D 55/084; E01C 23/04
(Continued)

(56) References Cited

U.S. PATENT DOCUMENTS 3,572,458 A * 3/1971 Tax .......................... B62D 7/02
                                                          180/411
3,664,448 A    5/1972 Hudis
(Continued)

OTHER PUBLICATIONS

Notice of Allowance received in U.S. Appl. No. 15/148,811; dated Mar. 15, 2017; 7 pages.
(Continued)

*Primary Examiner* — Gary Hartmann
(74) *Attorney, Agent, or Firm* — Kilpatrick Townsend & Stockton LLP

(57) ABSTRACT

A paving machine for spreading, leveling and finishing concrete having a main frame, center module, bolsters laterally movably, and a crawler track associated with respective aft and forward ends of the bolsters. A bolster swing leg for each crawler track supports an upright jacking column. A worm gear drive permits rotational movements of the crawler track and the jacking column. A hinge bracket is interposed between each swing leg and a surface of the bolsters to enable pivotal movements of the swing leg. A length-adjustable holder engages the pivot pin on the hinge bracket and pivotally engages the swing leg. The holder permits pivotal motions of the swing leg in its length-adjustable configuration and prevents substantially any motion of the swing leg in its fixed-length configuration. A feedback loop cooperates with transducers keeping the crawler tracks position. The paving machine can be reconfigured into a narrowed transport configuration.

15 Claims, 18 Drawing Sheets

Related U.S. Application Data application No. 13/897,125, filed on May 17, 2013, now Pat. No. 9,359,727, which is a continuation of application No. 13/069,096, filed on Mar. 22, 2011, now Pat. No. 8,459,898.

(60) Provisional application No. 61/318,223, filed on Mar. 26, 2010.

(51) Int. Cl.

| | | |
|---|---|---|
| *E01C 19/42* | (2006.01) | |
| *E01C 19/00* | (2006.01) | |
| *B62D 55/065* | (2006.01) | |
| *E01C 23/04* | (2006.01) | |
| *B62D 7/06* | (2006.01) | |
| *B62D 11/20* | (2006.01) | |

(52) U.S. Cl.
CPC ............ *E01C 19/002* (2013.01); *E01C 19/42* (2013.01); *E01C 19/48* (2013.01); *E01C 19/4853* (2013.01); *E01C 23/04* (2013.01)

(58) Field of Classification Search
USPC ......... 180/9.44, 9.46, 9.5, 408, 411; 404/85, 404/105
See application file for complete search history.

(56) References Cited

U.S. PATENT DOCUMENTS

| | | | | |
|---|---|---|---|---|
| 3,792,745 | A * | 2/1974 | Files | B62D 11/20 180/415 |
| 3,900,077 | A * | 8/1975 | Gee | B62D 11/20 114/313 |
| 3,970,405 | A * | 7/1976 | Swisher, Jr. | E01C 19/405 404/105 |
| 4,029,165 | A * | 6/1977 | Miller | B62D 11/20 180/6.48 |
| 4,360,293 | A * | 11/1982 | Wade | E02B 5/02 404/96 |
| 5,590,977 | A | 1/1997 | Guntert et al. | |
| 6,390,728 | B1 * | 5/2002 | Casters | E01C 23/04 404/100 |
| 6,471,442 | B1 * | 10/2002 | Deeb | E01C 19/40 404/105 |
| 6,481,923 | B1 * | 11/2002 | Casters | E01C 19/40 404/104 |
| 6,692,185 | B2 * | 2/2004 | Colvard | B62D 7/026 180/411 |
| 6,773,203 | B2 * | 8/2004 | Casters | E01C 19/40 404/101 |
| 6,872,028 | B2 * | 3/2005 | Aeschlimann | E01C 19/40 404/101 |
| 6,890,123 | B2 * | 5/2005 | Piccoli | E01C 19/4893 180/442 |
| 7,942,604 | B2 * | 5/2011 | Willis | B62D 7/026 404/83 |
| 8,100,481 | B2 * | 1/2012 | Von Schonebeck | B28D 1/18 299/39.6 |
| 8,118,518 | B2 * | 2/2012 | Guntert, Jr. | E01C 19/4853 404/100 |
| 8,459,898 | B2 * | 6/2013 | Guntert, Jr. | E01C 19/42 180/411 |
| 9,121,141 | B2 * | 9/2015 | Thieme | E01C 19/002 |
| 9,180,909 | B1 * | 11/2015 | Coats | B62D 11/003 |
| 9,359,727 | B2 | 6/2016 | Guntert, Jr. | |
| 9,663,162 | B1 * | 5/2017 | Pedersen | B62D 55/084 |
| 9,708,020 | B2 * | 7/2017 | Guntert, Jr. | B62D 55/084 |
| 9,764,762 | B2 * | 9/2017 | Klein | B62D 11/20 |
| 2016/0061327 | A1 | 3/2016 | Farr | |
| 2016/0137242 | A1 * | 5/2016 | Dahm | G05D 1/0891 180/8.6 |
| 2016/0244096 | A1 * | 8/2016 | Klein | B62D 11/20 |
| 2017/0106902 | A1 * | 4/2017 | Farr | B62D 5/26 |

OTHER PUBLICATIONS

Non-Final Office Action received in U.S. Appl. No. 15/148,811; dated Oct. 17, 2016, 12 pages.
Non-Final Office Action received in U.S. Appl. No. 13/897,125; dated Mar. 25, 2014, 7 pages.
Non-Final Office Action received in U.S. Appl. No. 13/897,125; dated Nov. 5, 2014, 7 pages.
Final Office Action received in U.S. Appl. No. 13/897,125; dated Jun. 24, 2015, 8 pages.
Notice of Allowance received in U.S. Appl. No. 13/897,125; dated Feb. 10, 2016, 8 pages.
Non-Final Office Action received in U.S. Appl. No. 13/069,096; dated Sep. 26, 2012, 8 pages.
Notice of Allowance received in U.S. Appl. No. 13/069,096; dated Feb. 11, 2013, 10 pages.

* cited by examiner

ADJUSTABLE BOLSTER SWING LEGS FOR SLIPFORM PAVING MACHINES

CROSS-REFERENCE TO RELATED APPLICATIONS

This application is a continuation-in-part of U.S. application Ser. No. 15/148,811, filed on May 6, 2016 (now allowed); which is a continuation of U.S. application Ser. No. 13/897,125, filed on May 17, 2013; now U.S. Pat. No. 9,359,727; issued Jun. 7, 2016, which is a continuation of U.S. application Ser. No. 13/069,096, filed on Mar. 22, 2011, now U.S. Pat. No. 8,459,898, issued Jun. 11, 2013; which claims the priority of U.S. Provisional Application No. 61/318,223, filed on Mar. 26, 2010, the disclosures of which are incorporated herein by reference.

BACKGROUND OF THE INVENTION

The present invention concerns concrete slipform paving machines that have a propelling unit or tractor from which a paving kit is suspended with which a layer of concrete is shaped and finished over the underlying ground as the tractor travels along a road or airfield alignment. The tractor of a concrete slipform paver has a rectilinear frame which straddles the concrete roadway or airfield pavement section that is being paved. The frame is propelled and supported on either end by crawler tracks mounted on side bolsters. These side bolsters each typically have two hydraulic supporting jacking columns, each of which connects to a crawler track, that allow the tractor frame elevation to be manually or automatically varied relative to the ground. The frame, and in particular a center module thereof, supports a diesel engine-driven hydraulic power unit which supplies power to the tractor and the paving kit.

The paving kit is conventionally suspended below the tractor frame by mechanical means, such as with hooks and a locking mechanism. The paving kit takes its hydraulic power from the power unit on the tractor. The tractor and the paving kit pass over fresh concrete placed in and distributed over its path as a relatively even and level mass that can be conveniently slipform-paved. During this process, the tractor-attached paving kit spreads the semi-solid concrete dumped in the path of the paver, levels and vibrates it into a semi-liquid state, then confines and finishes the concrete back into a semi-solid slab with an upwardly exposed and finished surface. The sideforms mounted on each side of the slipform paving kit shape and confine the sides of the slab during the slipform paving process. Other kits can be attached to these tractors such as kits for conveying and spreading concrete and trimming and spreading base materials.

The tractor normally has four crawler tracks, but can also have only three, each mounted to a jacking column, supporting and propelling the frame during use of the paver in the paving direction. The jacking columns are carried on the bolsters, or on bolster swing legs connected to the fore and aft ends of the side bolsters, that are pivotable about vertical axes to change the relative position of the crawlers for a variety of reasons and/or for changing the movement correction of the crawlers and therewith of the paving machine during use. The bolster swing legs with jacking columns and crawlers can also be relocated and mounted directly to the front and rear of the tractor center module, to the outside of the side bolsters or directly to the outside of the tractor center module in some less conventional paving applications. For the purposes of this description, the focus is on the manner in which bolster swing arms and the orientation of the crawlers can be changed and controlled in the more conventional paving configuration of the machine.

As is well known, tractor frames for slipform paving machines, which typically are extendable/retractable in the lateral direction to change the widths of the tractor frame and the remainder of the paving machine, have a generally rectangularly shaped center module or platform which supports, for example, the power unit including the engine for the paver, an operator platform, and the like. A side bolster is laterally movable and secured to each lateral side of the tractor frame (by means of male support tubes that telescopic in and out of the tractor center module), and bolster swing legs pivotally connect the fore and aft ends of the bolster to the respective jacking columns and crawlers of the paver. The swing legs are pivotally mounted to front and aft ends of the bolsters on vertically oriented hinge pins so that pivotal movement of the swing legs moves their end portions, which mount the jacking column and the crawlers, sideways relative to the paving direction of the paving machine and in a generally horizontal plane for increasing or decreasing the distance between the crawlers, and the distance and orientation of the crawlers relative to the tractor frame of the paving machine. Once the bolster swing legs supporting the jacking column with crawler track have the desired spacing between them and the desired orientation relative to the tractor frame, they are locked in place to prevent the crawler tracks from deviating from the desired direction/position and to absorb any existing tolerances between the bolster ends and the bolster swing legs which, if permitted to exist, allow undesired orientational deviations of the crawlers. In the past, turnbuckles and/or hydraulic cylinders were employed to prevent such tolerance-based play. To eliminate all play, two counteracting turnbuckle and/or hydraulic actuators arrangements were sometimes employed to establish a positive, immovably locked position and orientation for each crawler track.

The position fixing turnbuckles and/or hydraulic actuators were secured to mounting brackets that were bolted to a hole pattern in the front (or aft) facing surfaces of the tractor frame and the bolster swing legs and/or between the side bolster ends and the bolster swing legs. To be effective, the turnbuckles/hydraulic actuators must have a substantial angular inclination relative to the bolster swing leg. If this angular inclination becomes too small, the turnbuckles/hydraulic actuators lose effectiveness and rigidity, which, if permitted to occur, can lead to undesired deviations in the desired orientation of the crawler tracks, and if the inclination becomes too large, the distance between the point of connection of the turnbuckles/hydraulic actuators to the tractor frame and to the bolster swing leg can exceed the effective length of the turnbuckle or hydraulic actuator.

Thus, in the past, when the machine width had to be changed by a significant amount it became necessary to reposition the turnbuckle/hydraulic actuator mounting bracket along the length (in a lateral direction that is perpendicular to the travel direction) of the tractor frame to maintain the angular inclination of the turnbuckle/hydraulic actuator within an acceptable range. This was a time-consuming task that required skilled workers and, therefore, was costly. In addition, the time it takes to change the position of the mounting bracket for the turnbuckle/hydraulic actuator is a downtime for the machine during which it is out of use and cannot generate revenues.

Bolster swing legs are used so that the crawler tracks can be relatively quickly relocated in relationship to the edge of the concrete pavement that is being laid down from the normal straight-ahead position, for example to avoid obstacles in the path of the crawler tracks or to make room that may be required to allow tie bars to pass the inside of the rear crawlers and the like. One of the conventional ways of relocating the crawler track was to support the side bolster of the tractor, using the jacking column to hydraulically lift the crawler off the ground, then to use one or more turnbuckles (or one or more hydraulic actuators) to mechanically pivot the bolster swing leg with the jacking column and crawler track and, once the desired position is reached, to hold it there with a turnbuckle or steamboat ratchet (or actuator). If only one turnbuckle is used in the normal position, which is the inboard side of the bolster swing leg, the swing leg is free to move due to the inevitable manufacturing and assembly clearances and tolerances in the turnbuckle connections. These clearances are undesirable because if the swing leg is allowed to pivot or tilt under varying loads, it can adversely affect steering and elevation control. Because of this connection play, opposing turnbuckle sets were at times employed, one being located in the inboard side and one or more turnbuckles being located on the outboard side of the swing leg. In such an arrangement, after the crawler track is in the desired position, the opposing turnbuckles are tensioned (pulled) against each other to keep the swing leg from moving. This transfers all the clearance in the pin connections to one side of the hole, eliminating any possible movement in the connection. The drawback of this approach is that the outboard turnbuckles increase the overall machine profile outside the edge of concrete and therefore require more room for the machine when paving past obstacles in tight confines. If the outboard turnbuckle angle is decreased to decrease the machine profile, the effectiveness of the turnbuckles at this flat angle in holding the swing leg can decrease to almost nil. Further, every time the crawler track is relocated, all the turnbuckles must be readjusted.

Attempts have been made to eliminate the need for the outboard opposing turnbuckles by adding a hydraulic cylinder/actuator between the tractor frame and the swing leg behind the turnbuckle on the inboard of the leg. The cylinder effectively pushes the pin connection clearances to the inside of the turnbuckle connection holes and eliminates the risk of swing leg movement by keeping the hydraulic actuator pressurized.

The relocation of the bolster swing leg and crawler track in relationship to the tractor frame is further adversely affected by the need to relocate the turnbuckle connection on the tractor frame where it connects to the bolsters to which the swing leg is attached. The turnbuckle connection on the bolster swing leg side typically stays at the same connection point. In the past, the turnbuckle connection to the tractor frame posed several problems. One such problem was when the tractor frame was telescoped narrower. At wider tractor widths, the turnbuckle connects to the outboard end of the support beam of the tractor frame with a turnbuckle bracket that is bolted to the male support beam (that telescopes in and out of the tractor center module) with two or more bolts; however, if the tractor frame is telescoped narrower, the bracket will eventually interfere with the tractor center module, which prevents the further narrowing of the tractor frame. Once this point is reached, the turnbuckle mounting bracket therefore had to be unbolted from the male support beam and rebolted to the tractor center module. To maintain the optimum turnbuckle angle to the swing leg so the turnbuckle is effective in holding the leg in the desired position, the turnbuckle bracket had to be relocated along the tractor center module repeatedly, which slowed down the machine width change process during each change. The inboard turnbuckles can also interfere with other attachments required on the front and rear of the machine, such as a spreader plow that is mounted off the front of the tractor frame, which had to be disconnected and reconnected, which increases costs further. Another problem was when the swing leg complete with jacking column and crawler track is relocated to the outside of the side bolster or mounted directly to the tractor center module, in some paving applications there was no place to connect the bolster swing leg or turnbuckles (hydraulic actuators).

The relocation of the bolster swing legs and crawler track in relationship to the tractor frame is further adversely affected by the steering cylinders that typically were used on the jacking columns. The steering cylinders allow the crawler track angle to be changed in relationship to the jacking column for manual or automatic steering purposes. In the past, the steering cylinders at times protruded to the outside of the associated steering column. This is undesirable because it increases the outside width of the paving machine, which dictates and will limit how close the machine can pave next to a building or obstruction, and the stroke of the steering cylinder dictates how far the swing leg can be swung inboard or outboard. Amongst others, such a jacking column steering cylinder configuration does not allow the crawler tracks to be rotated 90° from their normal operating orientation without the time-consuming repinning or repositioning of the steering, which is a drawback.

It is however highly advantageous to rotate the crawlers to such a 90° steering position (and being able to steer the crawler track in that position) from their normal position when readjusting the machine for paving different widths, maneuvering the machine around the jobsite, or for readying the machine for transport to a different paving site. In such an event, the swing legs with jacking columns and crawlers are pivoted relative to the tractor frame until the crawlers extend in the lateral direction (which is perpendicular to the normal paving direction) of the paving machine, which minimizes the width of the paving machine so the gauge between the crawler tracks in the transport position is narrow enough to walk the machine onto a trailer and for its transportation over normal roads to a new site. This outboard 90° bolster swing leg orientation is not to be confused with rotating just the crawler tracks in the 90° position using 90° steering.

Thus, when repositioning the crawler tracks of a paving machine in accordance with conventional methods, the machine is initially appropriately supported so that a first one of the bolster swing leg-mounted crawler tracks can be lifted off the ground. The turnbuckle is then used to pivot the bolster swing leg until the jacking column and the associated crawler are at the desired (lateral) position and have the required crawler orientation. If the needed lateral movement of the crawler is too great, the turnbuckle mounting bracket must be repositioned by unbolting it from the frame and rebolting it thereto at a hole pattern located at the appropriate (lateral) point on the tractor frame or the center module. Thereafter, the turnbuckle is tightened in the new position of the crawler so that the bolster swing leg can no longer move and the orientation of the crawler is maintained. Thereafter, the crawler is lowered to the ground, it is rotated about the vertical axis of the jacking column to place it in the desired orientation, and an orientation measuring transducer is reset for the new crawler orientation to keep the crawler in the straight-ahead position. This has to be repeated for each of the typically four crawlers of the paving machine, a process that is time-consuming, costly and results in a prolonged, unproductive downtime for the machine. This cost is encountered each time the lateral position of the crawler and/or turnbuckle mounting bracket is changed and the crawlers must then be reoriented relative to the frame so that they face in the required transport direction. This procedure is also used to ready the paving machine for transportation to a new work site. In such an event, the swing legs are pivoted relative to the frame until the crawlers extend in the lateral direction (which is perpendicular to the normal paving direction) of the paving machine, which minimizes the width of the paving machine for transportation to a new site.

In an alternative approach used in the past, the crawlers and the associated jacking columns were connected to the fore and aft ends of the side bolsters and fixed mounted to the end of the parallel linkages and oriented so that the crawlers extend in the paving direction of the paving machine. The parallel linkages typically include a hydraulic actuator to assist in the crawler track relocation and to hold the crawler track in the desired position. This approach simplified the lateral adjustment of the positions/orientations of the crawlers in relationship to the tractor as compared to crawlers mounted on pivoted swing legs because no matter where the crawler track was repositioned, the crawler track always remained oriented straight ahead and the turnbuckle relocation issue went away. However, in such arrangements, the limited range of movement of the parallel linkages with hydraulic actuator limits how narrowly the machine can be collapsed for transporting it over highways (with standard highway width restrictions) to new construction sites. The ability to quickly and efficiently move the paving machine from one site to the next, which is highly desirable for the efficient use of the machine, is lost with this approach. Instead, paving machines employing such parallel linkages for the crawlers required that the tractor frame itself had to be collapsed in order to narrow the width of the machine sufficiently so that it could be transported over highways. This requires that either the paving kit itself be telescopic or that the paving kit is removed from the tractor. In either case, this could significantly increase the overall cost of the machine or the cost or time required for moving the machine and is therefore an undesirable alternative. The only way to overcome this limitation is to add a pivot hinge (with a means to lock/pin the pivot hinge in either the working or transport position) between the side bolster and the parallel linkage to allow the parallel linkage with jacking columns and crawlers to pivot outboard relative to the tractor frame until the crawlers extend in the lateral direction (which is perpendicular to the normal paving direction) of the paving machine required for loading on a trailer and transport. Of course, adding the pivot hinge with a pinning mechanism to each corner of the machine is costly, and pinning and unpinning of the hinge is time-consuming.

BRIEF SUMMARY OF THE INVENTION

According to a first aspect of the present invention, each bolster swing leg is pivotally mounted on a hinge bracket that is secured to the front (or aft) ends of the side bolsters of the paving machine. This bracket also supports the turnbuckle or, preferably, a hydraulic actuator which eliminates the need to tie the swing leg into the tractor frame for holding the swing leg, and the crawler track secured to it, in a fixed position during paving. One end of the turnbuckle or actuator is tied into the swing leg conventionally, while the other end is mounted to the hinge bracket. This eliminates the need encountered in the past to relocate the turnbuckle mounts on the tractor frame when the width of the tractor frame is changed. Instead, in accordance with the present invention, every time the width of the paving machine is changed, the attachment point for the turnbuckle or hydraulic actuator automatically follows the positional change of the swing leg because the attachment point is mounted on the hinge bracket, that is, in a fixed position relative to the bolster and the swing leg.

To facilitate the required realignment of the crawler tracks, another important aspect of the present invention preferably replaces the turnbuckles with hydraulic actuators and provides angular position transducers at the pivot connection for the swing leg at the hinge bracket and another such transducer between the jacking column and the crawler track. An onboard computer or other processor receives the outputs from the transducers and generates a signal to pivot the crawler track relative to the associated jacking column to keep the crawler tracks oriented in the paving direction when the angular orientation of the swing leg changes, and also keeps all the crawler tracks' orientations synchronized. Thus, no matter what the swing leg angle is, the crawler track stays straight ahead in the paving direction and position. Of course it is also possible to override this computerized feature so the crawler track orientation can be changed relative to the bolster swing leg, which may be required from time to time for width change, maneuvering on site, etc.

The bolster swing leg hydraulic actuator and the hydraulic rotary power drive or steering cylinder for pivoting the crawler track relative to the jacking column working in cooperation with the position transducers allow the swing leg with crawler track to be held in a fixed location in relationship to the edge of the concrete. A closed loop feedback system that connects the hydraulic actuator for the swing leg, the rotary power drive for the crawler, and the onboard computer always maintains the swing leg angle at a fixed, preset angle. If the swing leg migrates away from a preset angle, the swing leg hydraulic cylinder is actuated to maintain the preset angle and at the same time the necessary adjustments to the crawler track orientation are made with the hydraulic rotary power drive or steering cylinder. Alternatively, a hydraulic system using a locking valve can be provided instead of the position transducer and feedback loop for holding the swing leg in the desired position.

Thus, the crawler track positions can be relocated when the machine is walked forward or backward while the crawler tracks at all times stay in their straight-ahead normal operating orientation and position without requiring any manual mechanical or electronic adjustments. The crawler tracks can also be relocated when the machine is stationary by supporting the weight of the machine off the ground, then hydraulically lifting each crawler track (one at a time) off the ground, and thereafter using the swing leg hydraulic cylinder and position transducer working in conjunction with the power drive or steering cylinder between the jacking column and the crawler track for moving the crawler track to another position.

A still further aspect of the present invention eliminates the need to reposition the steering cylinder on the jacking columns when the crawler track is repositioned within the range of the swing leg cylinder and to allow 90° steering without having to reposition the steering cylinder by employing a hydraulic motor driven rotary actuator (slew gear) with an angular position transducer as the power drive between the crawler track and the jacking column. The rotary actuator also allows a wide range of steering angles while in the 90° steering mode to make the machine highly maneuverable on site. Working in conjunction with the swing leg position transducer, and after unpinning the swing leg hydraulic cylinder from the swing leg, the rotary actuators allow the machine to be preprogrammed to first turn the crawler tracks relative to the jacking columns normal to the paving direction, and then walk the crawler tracks on the ground in an arc around the pivot shaft of the swing legs into their outboard transport position (in which the crawlers are oriented 90°, i.e. substantially transverse to the paving direction) so that the paving machine can be sufficiently narrowed for moving it over ordinary highways to a new paving site with a legal or otherwise approved transport width dimension, or, for maneuvering the paving machine around a paving site which is tightly confined. The heretofore common need to manually move the swing legs with jacking columns and crawler tracks into the outboard position as previously described is thereby eliminated, which significantly reduces the time required to ready the machine for transport and/or for maneuvering the machine at the work site.

Thus, a paving machine constructed in accordance with the present invention has a main frame that includes a center module, a side bolster that is laterally movably connected to respective lateral sides of the center module for changing a spacing between the bolsters, a crawler track associated with respective aft and forward ends of the bolsters, and a bolster swing leg for each crawler track. An upright jacking column is secured to the free end of the swing leg, and a connection between the jacking column and the crawler track permits rotational movements of the crawler track and the jacking column about an upright axis. A hinge bracket is interposed between each swing leg and an associated surface of the bolsters and includes a fixed, upright pivot shaft that pivotally engages the swing leg for pivotal movements in a substantially horizontal plane. The hinge plate includes a pivot pin that is laterally spaced from and fixed in relation to the pivot shaft. A length-adjustable, preferably hydraulically actuated, holder is capable of being held at a fixed length and has a first end that pivotally engages the pivot pin and a second end that pivotally engages the swing leg. The holder permits pivotal motions of the swing leg about the hinge pin when in its length-adjustable configuration and prevents substantially any motion of the swing leg when the holder is in its fixed-length configuration.

BRIEF DESCRIPTION OF THE DRAWINGS

Illustrative aspects of the present disclosure are described in detail below with reference to the following drawing figures. It is intended that that embodiments and figures disclosed herein are to be considered illustrative rather than restrictive.

FIG. 4A is an enlargement of the portion of FIG. 4 within the circle A-A of FIG. 4;

DETAILED DESCRIPTION OF THE INVENTION

Figure 1:
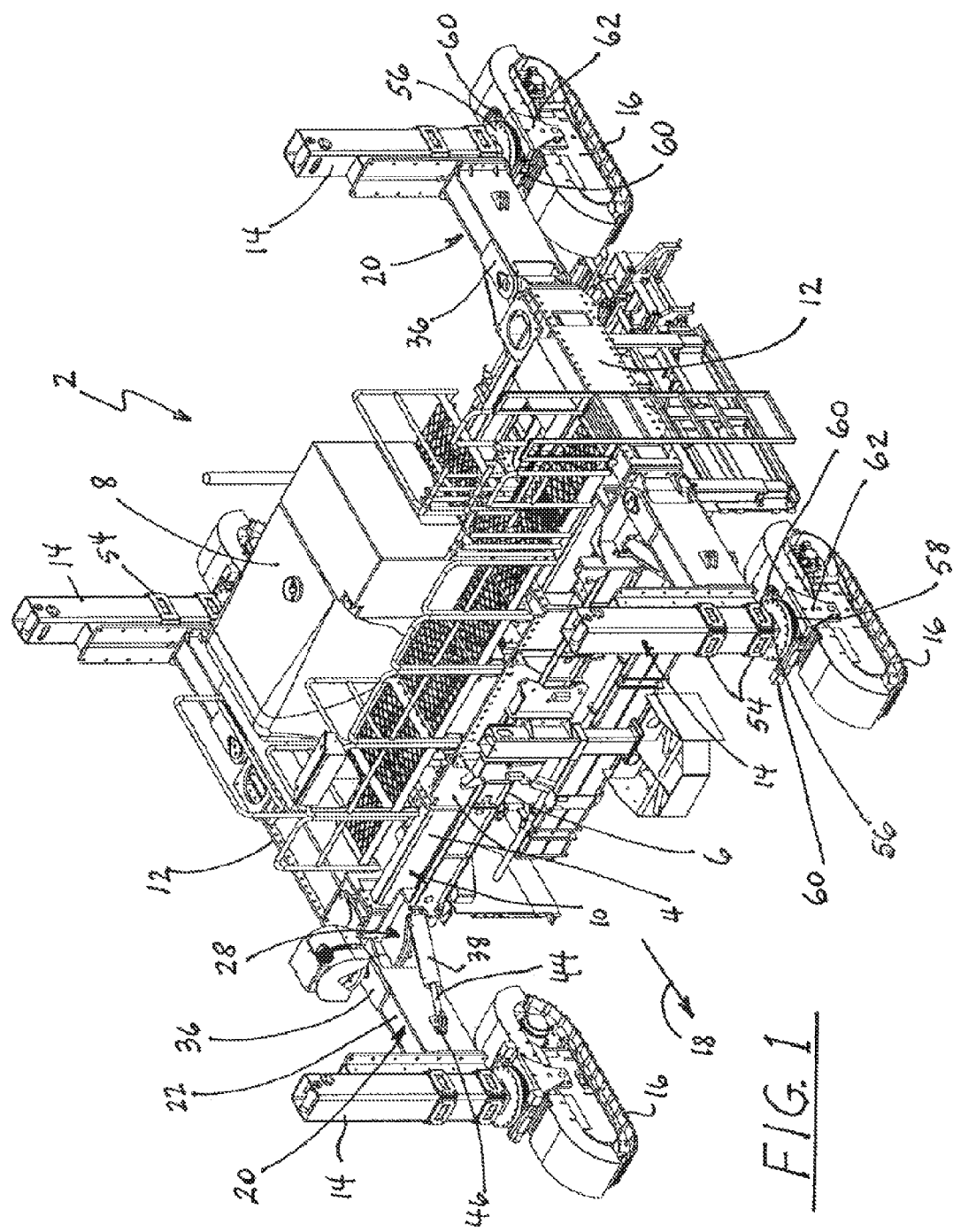
FIG. 1 is a front elevational, perspective view of a complete paving machine having pivotable swing legs with a jacking column and a crawler, each constructed in accordance with the present invention.

Referring initially to FIG. 1, a concrete slipform paving machine 2 has a main tractor frame 4 defined by a center module or platform 6 that carries the diesel engine powered power unit 8 of the paving machine and from which extendable or telescoping male support beams 10 extend outwardly in a lateral direction. Side bolsters 12 are secured to the respective outboard ends of the support beams. Upright jacking columns 14 are mounted in the vicinity of respective front and aft ends of the bolsters, and crawlers 16 are conventionally secured to the lower ends of the jacking columns. The jacking columns are hydraulically powered for raising and lowering of the paving machine relative to the crawlers on the ground. The crawlers are mounted to the lower ends of the jacking columns, and they are rotatable relative to the jacking columns about vertical axes, an arrangement that is known in the art. The crawlers support the entire machine and move it over the ground.

The respective bolsters can be moved in the lateral direction relative to the center module so that the machine frame, including the crawlers, straddles a paving kit (not separately shown) that extends over, clears and forms a strip of concrete (not shown) being laid down by the machine. When finished, the strip of concrete defines an upwardly exposed, appropriately leveled and finished concrete surface (not shown) that extends across the strip between the upright sides of the concrete strip.

In use, the paving machine is aligned with the paving direction 18 so that the concrete strip can be laid between the crawlers 16 of the machine over a width determined by a paving kit 63 suspended from the main tractor frame. Fresh concrete is deposited in front of the machine, a spreader plow or a spreading auger (not shown) approximately levels the concrete over a major portion of the width of the concrete strip, and, as the machine advances forwardly, a metering gate substantially evenly spreads the top of the fresh concrete. Following the "liquification" of the concrete by vibrators supported by a vibrator rack at a fixed elevation on the front side of the paving kit, finishing pans (not shown in FIG. 1) are provided on the aft end of the paving kit to finish the top surface of the concrete as the paving kit passes over it, while sideform(s) form the sides of the concrete strip or slab. A finished concrete strip emerges from the aft end of the paving machine and is permitted to conventionally set and harden.

Referring to FIGS. 1-5, each crawler 16 and the associated jacking column 14 are mounted to a free end 19 (shown in FIG. 7) of a bolster swing leg 20. The swing leg is typically formed as a box beam 22 and has another end 21 (shown in FIG. 7) that is pivotal about a vertically oriented pivot shaft 24 which extends through a bearing bushing 26 that is supported in its vertical orientation on a hinge bracket 28 with spaced-apart support webs 30.

Figure 7:
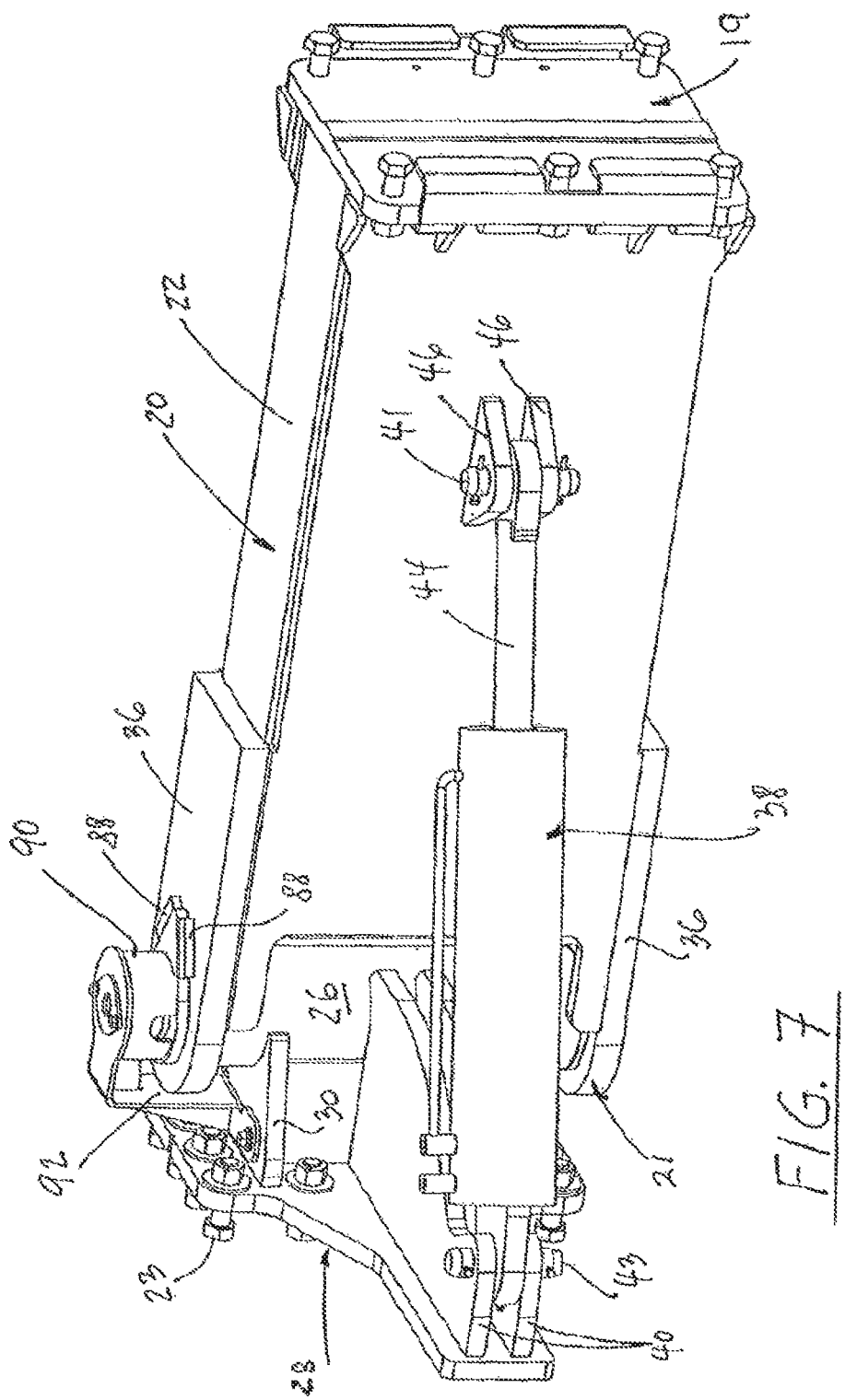
FIG. 7 is a perspective, side-elevational view showing the bolster swing leg that is pivotally secured to the hinge bracket.

The hinge bracket has appropriately positioned fastening holes 32 for securing it to respective end surfaces 34 of side bolsters 12 with conventional bolt and nut fasteners 23 as shown, for example, in FIG. 7. A female keyway is provided on the jacking column bolting flange 57 (shown in FIG. 4) with male keyways provided on the mating bolting flanges to take the shear of the bolts and to eliminate possible misalignment.

The ends of box beams 22 adjacent bolster end surface 34 have connector plates 36, secured to the top and bottom surfaces of the box beam by welding, for example. The connector plates project towards the tractor frame past the end of the box beam and have holes that pivotally engage pivot shaft 24 in bearing bushing 26 of the hinge bracket so that the swing legs are free to pivot relative to bolsters 12 in a horizontal plane (as indicated in FIG. 2) about an upright axis defined by the pivot shaft.

Figure 2:
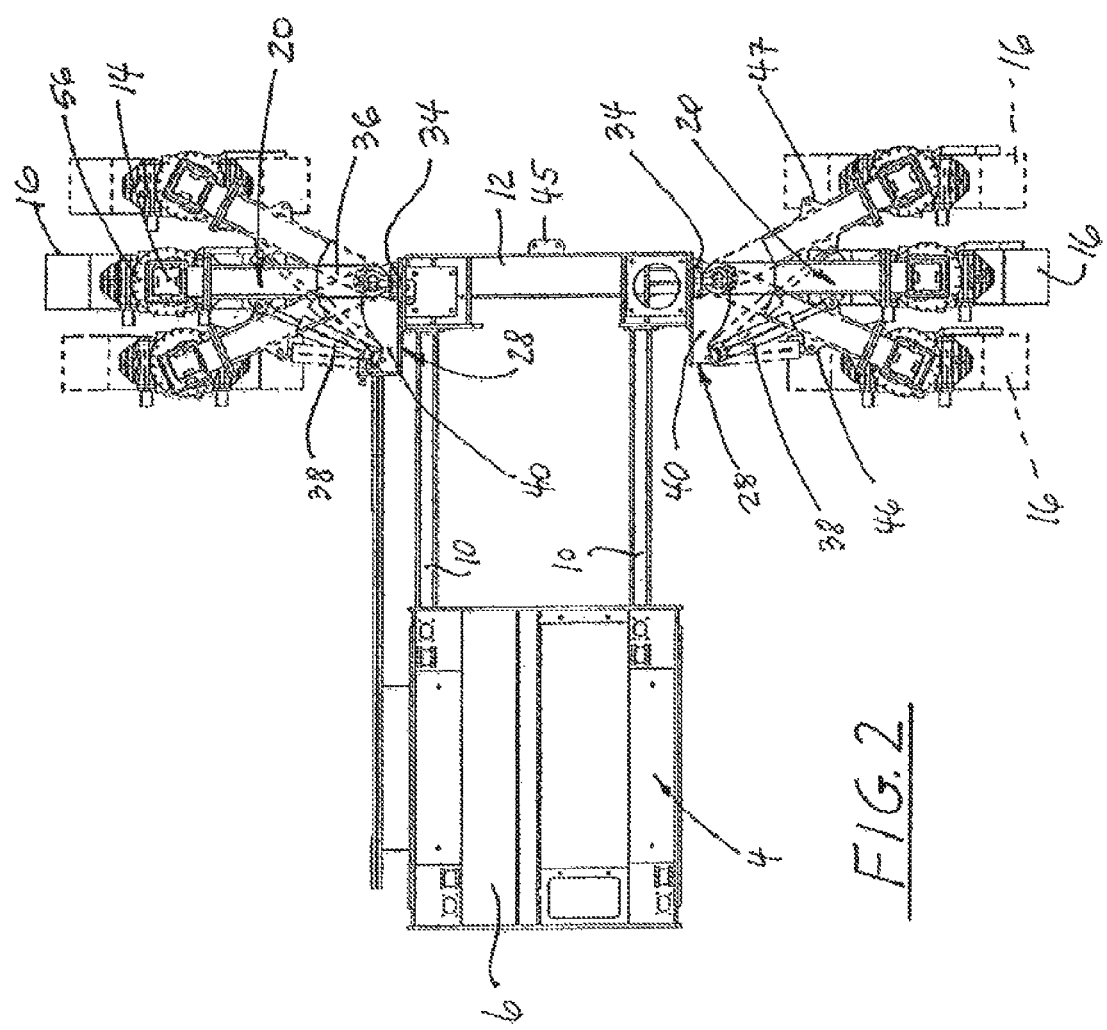
FIG. 2 is a partial, simplified plan view of portions of a paving machine illustrating the pivotal swing leg of the present invention.
Figure 3:
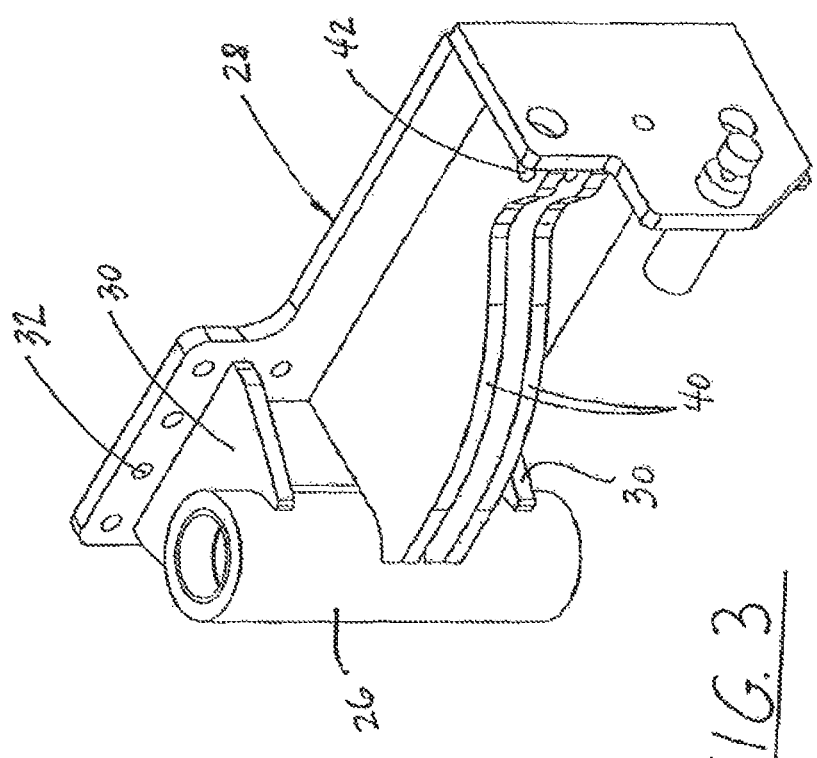
FIG. 3 is a perspective, front elevational view of a hinge bracket for securing the swing leg to the paving machine.

The closed end of the cylinder of a hydraulic actuator 38 is pivotally pinned to two spaced-apart support plates which are secured, e.g. welded, to the inside of the hinge bracket 28 and a mid-portion of bearing bushing 26, as is best seen in FIG. 3. The support plates include aligned bores 42 that are laterally spaced some distance away from the bearing bushing 26. The closed end of the hydraulic cylinder is pivotally movably secured to the support plates with a pin that extends through the bores. The piston 44 of the hydraulic actuator is pivotally pinned to a pair of spaced-apart brackets 46 which are located between the ends of the swing leg and typically relatively closer to its free end 19. When the hydraulic actuator is pinned to the hinge bracket 28 and the brackets on bolster swing leg 20, it is angularly inclined relative to the paving direction 18, as best seen in FIGS. 1 and 2. It is foreseen that on a larger machine more than one, e.g. two, vertically spaced-apart hydraulic cylinders placed above each other may be required to generate the force required to hold the bolster swing leg in a fixed position relative to the male pivot hinge. Further, if desired, for example for cost reasons, hydraulic actuators can be replaced by turnbuckles.

When assembled installed between hinge bracket 28 and swing leg 20, hydraulic actuator 38 can be energized to pivot bolster swing leg 20 in a horizontal plane as schematically illustrated in FIG. 2. Since hinge bracket 28 is secured to end face 34 of bolster 12, the angular inclination of the actuator relative to the bolster swing leg does not change when the length of the tractor frame 4 (in the lateral direction perpendicular to the normal paving direction 18) is changed. There is therefore no need to reposition the hinge bracket that secures one end of the hydraulic actuator to the machine frame, as was necessary in the past. The extendable length of the hydraulic actuator and its attachment points to hinge bracket 28 and swing leg 20 are chosen so that the angular inclination of the hydraulic actuator relative to the bolster swing leg is maintained over a reasonably large arc (as schematically illustrated in FIG. 2) that is sufficient to permit repositioning of the swing leg during normal use encountering normal operating conditions of the paving machine without having to disconnect the actuator from the swing leg and/or the hinge bracket.

However, when the swing legs are to be rotated 90° from the paving direction 18 towards a position that is laterally outward of bolsters 12, principally for readying the paving machine so that it can be transported by truck and trailer to a new location, hydraulic actuator 38 is disengaged from at least one of the swing leg or the hinge bracket 28, for example by pulling pin 41 that connects the end of piston 44 to brackets 46 on the swing leg, to prevent interference between the hydraulic actuator and support plates 40 and/or bearing bushing 26 of the hinge bracket.

When bolster swing legs 20 are longitudinally aligned with tractor frame 4 and its laterally extending support beams 10, a position in which the legs are oriented approximately perpendicular to paving direction 18, it is preferred to pin the swing legs in that position during shipment of the paving machine with a turnbuckle or other fastener (not shown) to webs 45, 47 on the laterally facing surfaces of the bolster and the swing leg as seen in FIG. 2. The turnbuckle or the like is released at the new location so that the swing legs can be returned to their normal operating position in which they are parallel, or only slightly angularly inclined relative to the paving direction 18.

Each time the bolster swing legs 20 are pivoted inwardly or outwardly relative to tractor frame 4 of the paving machine, the relative angular inclination between the bolster swing legs and the tractor frame changes. This change is replicated by crawler tracks 16 mounted below jacking columns 14 at the free end of the swing legs. This change in crawler track orientation has to be compensated for so that, following the pivotal movement of the swing leg, and preferably simultaneously therewith in real time, the crawler tracks extend in the paving direction. This is done by adjusting the angular orientation of the crawler track by an amount that depends on or is a function of the angular displacement of the swing legs relative to the hinge bracket 28 so that the crawler tracks always remain in alignment with paving direction 18 of the paving machine, as is schematically illustrated in FIG. 2 by the parallel orientation of the crawler tracks (in part shown in phantom lines in FIG. 2) irrespective of the angular orientation of the swing legs. This relocation process can be accomplished while the machine is supported so the crawler track can be lifted off the ground and relocated to the desired location inwardly or outwardly. With this relocation process, typically each swing leg/crawler track is relocated one at a time. Alternatively, this relocation process can also be accomplished while the machine is walking forward or backward. For example, for moving outwards, the angle of the crawler can be hydraulically "jogged" slightly outward while walking the swing leg/crawler track to the desired location with or without the assistance of the swing leg hydraulic cylinder. Once the desired position is reached and the job switch disengaged, the crawler track will automatically go back to the straight-ahead position. In the alternate case, the crawler track relocation process is done while walking in the forward or reverse direction moving one swing leg/crawler track at a time or moving more or all four at a time.

Figure 4:
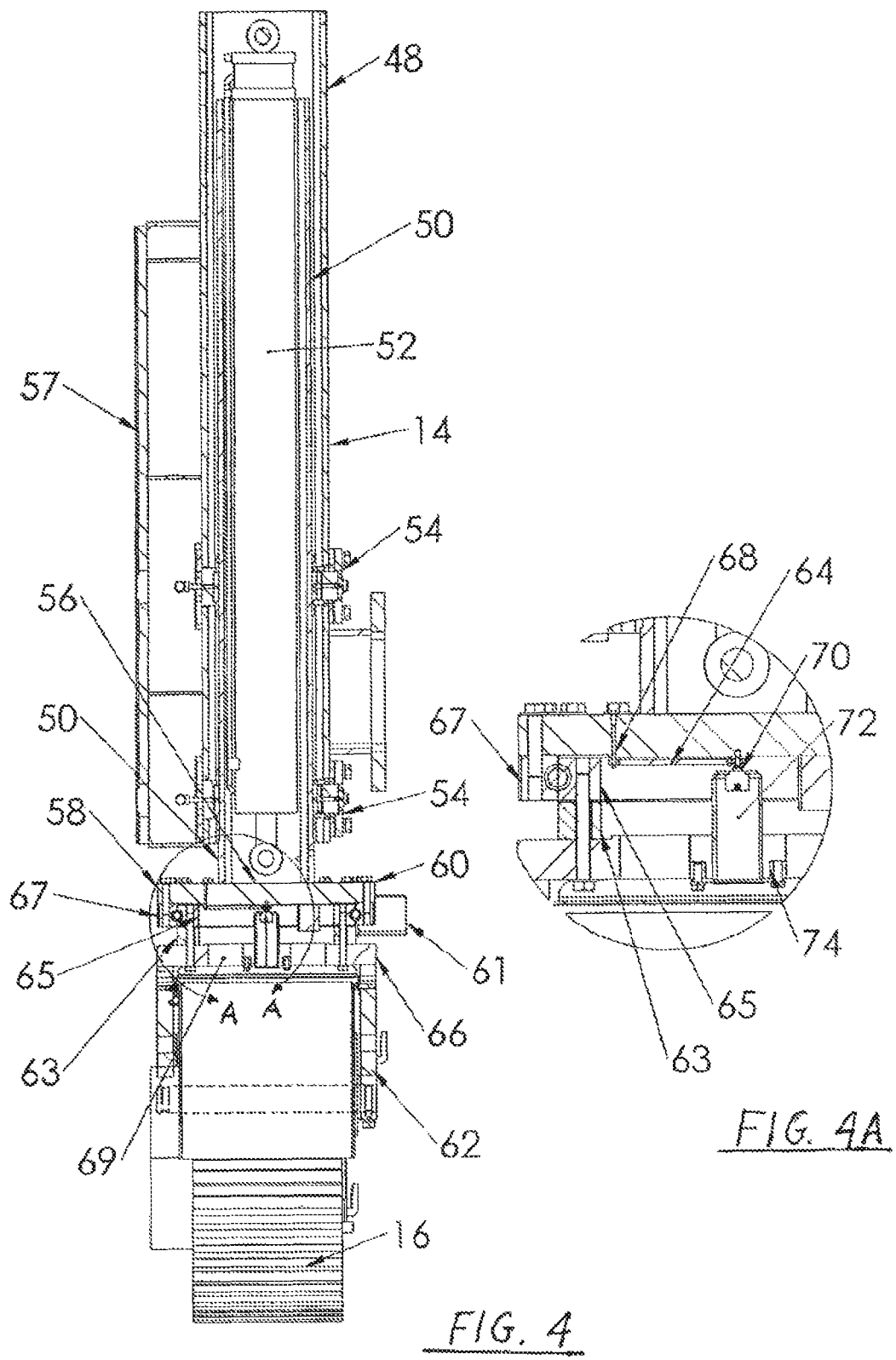
FIG. 4 is a front elevational view, in section, taken through the vertical center line of the jacking column and crawler, which are only schematically shown in FIG. 1.

Referring to the drawings, and particularly to FIGS. 4 and 7 thereof, jacking column 14 has telescoping outer and inner tubes 48, 50 of a generally rectangular cross-section, as is typical for jacking columns on paving machines, and a vertically oriented hydraulic actuator 52 having its cylinder and piston appropriately secured, e.g. by pinning, to the outer and inner tubes. Activation of the hydraulic actuator telescopingly moves the outer and inner tubes relative to each other for lengthening or shortening the distance between the crawler track and the bolster swing leg 20 for raising or lowering the paving machine relative to the ground or, while the paving machine is otherwise supported, raising or lowering the crawler track off the ground. Spaced-apart axial bearings 54 keep the tubes aligned and permit them to slide relative to each other in their axial direction while maintaining tight clearances to minimize backlash. A support structure 57 is further provided for securing the jacking columns to free ends 19 of the bolster legs. This construction of jacking column 14 is conventional and is therefore not further described herein.

A slew or worm gear drive or other rotary actuator 60 is bolted to a mounting plate 56 at the lower end of inner tube 50 of the jacking column. The worm gear drive has a ring gear 58 that is driven by a pair of diametrically opposite, hydraulically activated helical worm drives 61 carried on a ring-shaped member 63 disposed between an inner bearing race 65 of the worm gear drives and a transverse portion 66 of yoke 62, to which the ring-shaped member is secured. An outer bearing race 67 is secured, e.g. bolted, to the lower end of mounting plate 56 at the end of inner tube 50. On its periphery, the outer bearing race 67 defines ring gear 58. Such slew gear drives are commercially available from Kinematics Manufacturing, Inc., of 2221 W. Melinda Lane, Phoenix, Ariz. 85027, as "Slewing Drive s17b-102m-200ra". Providing the slew gear drive with two oppositely arranged worm drives increases the power available to rotate the crawler track while a portion of the total machine load is carried by it. The slew drive design also effectively minimizes undesirable play or "backlash" during steering of the crawler track and effectively minimizes undesirable play or backlash between the yoke 62 and the jacking column 14 whether the slew gear drive is activated or deactivated.

An angular position transducer or sensor 70 is arranged inside an upwardly open can 72 (provided to protect the sensor) that is disposed within an opening 69 in the transverse portion 66 of yoke 62. Supports 74 extend across opening 69 and secure the can with transducer 70 at the rotational center between the jacking column and the yoke. The transducer cooperates with a trigger pin 68 extending downwardly from the under side of plate 56 and a suitable actuator arm that turns the transducer. Alternatively, the trigger pin can cooperate with the transducer via a belt drive 64 as schematically indicated in FIG. 4A.

Transducer 70, in cooperation with trigger pin 68, generates a signal that indicates the angular position of yoke 62 relative to jacking column 14 and any changes in the angular position due to rotational movements of the yoke. Corresponding output signals are generated by the transducer and fed to a lead 84 not shown in FIG. 4 but shown in FIG. 5.

Figure 5:
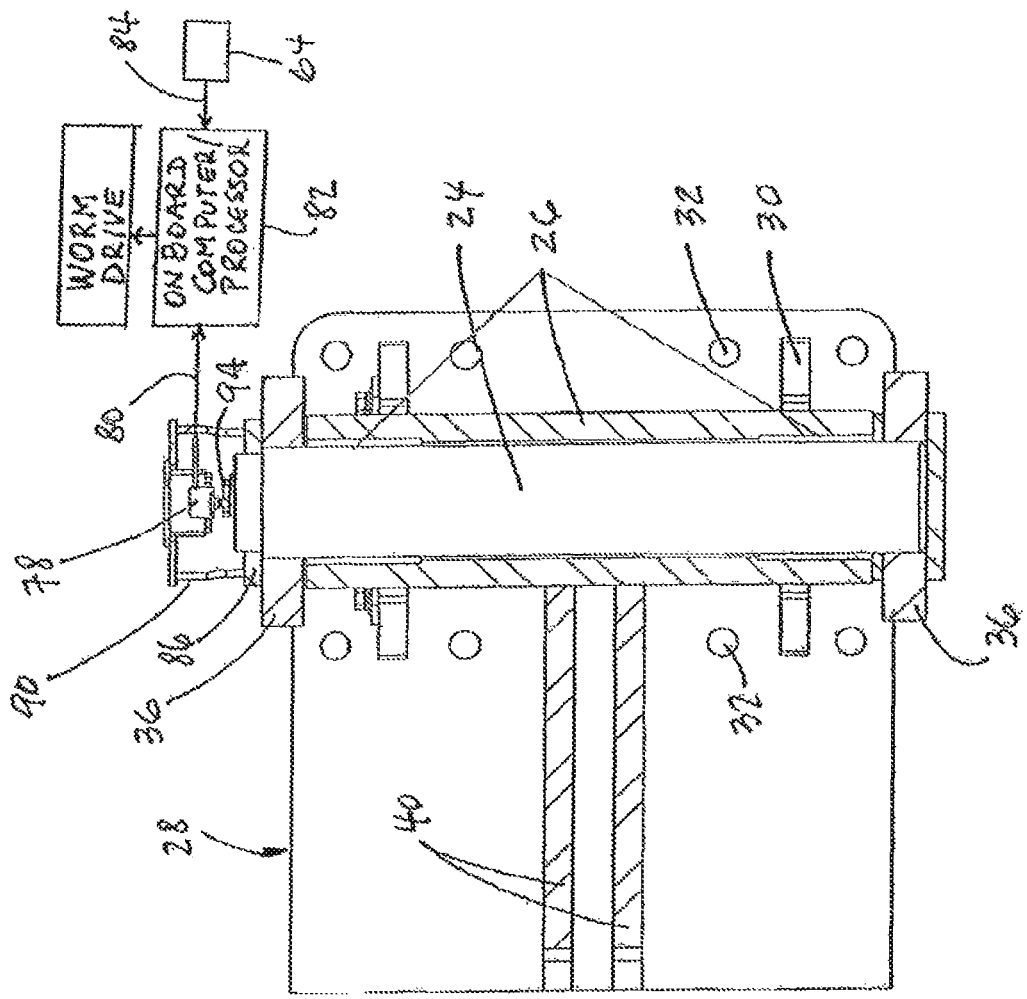
FIG. 5 is a front elevational view, in section, through the pivot connection between the hinge bracket shown in FIG. 3 and the bolster swing leg attached thereto with a pivot pin.

Referring to the drawings, and in particular to FIGS. 5 and 7 thereof, another angular position transducer 78 is placed on top of swing leg pivot shaft 24 (FIG. 5). As is best seen in FIG. 7, the top of the pivot shaft defines a generally drop-shaped head 86 that is engaged by blocks 88 fixed to the upper side of connector plate 36 so that pivot shaft 24 is rotationally fixed to the connector plate and duplicates the angular movements of swing leg 20 about the pivot shaft. Replaceable bearings are provided at the top and bottom of the male hinge bearing (shown in FIG. 3) as well as a means to get grease to them (not shown in the drawings) so the pivot shaft 24 does not seize in the bearing, which would prevent the swing leg from freely rotating.

Angular position transducer 78 is mounted inside a downwardly open protective can 90, as seen in FIG. 5, which is bolted to hinge bracket 28 via an upright holding arm 92.

A trigger pin 94 projects upwardly from the top surface of pivot shaft 24 and cooperates with angular position transducer 78 to generate an angular position signal which reflects the angular inclination between the pivot shaft and the hinge bracket, and which changes when the bolster swing leg 20 changes its angular position relative to the hinge bracket 28, and therewith also relative to bolster 12 and tractor frame 4. The output of transducer 78 is fed to a lead 80.

The output signal of the position transducer 78 is fed via lead 80 to an onboard computer 82 of the paving machine, or another suitable processor, which receives as its second input the output signal of position transducer 70 between jacking column 14 and crawler tracks 16 via a lead 84, as is schematically illustrated in FIG. 5.

Onboard computer or processor 82 and the associated transducers 70, 78 form a feedback loop in which the computer receives the angular position signal from swing leg transducer 78. When the angular position of the swing leg changes, the output signal from transducer 78 changes correspondingly. As a result of this orientational change of the swing leg, the angular orientation of the crawler tracks becomes angularly inclined relative to paving direction 18. Computer 82 calculates by how much the angle of the crawler track has to be changed relative to the jacking column (which has also been angularly offset relative to the transport direction by the swivel motion of the swing leg) to reset the crawler track suspended from yoke 62 to the angular orientation of the desired paving direction. The onboard computer then signals by how much worm gear drive 60 must rotationally adjust the orientation of yoke 62 and crawler tracks 16 to again align the crawler tracks with the paving direction. This process is repeated each time the angular position of the swing leg is changed, or when for other reasons the angular orientation of the crawler tracks becomes misaligned from the desired paving direction of the machine.

Thus, the above-described feedback loop automatically adjusts the angular orientation of the crawler tracks so that the tracks remain oriented in the travel direction without any need to stop operation of the machine or manually adjust the orientation of the tracks and/or the swing legs.

Figure 8:
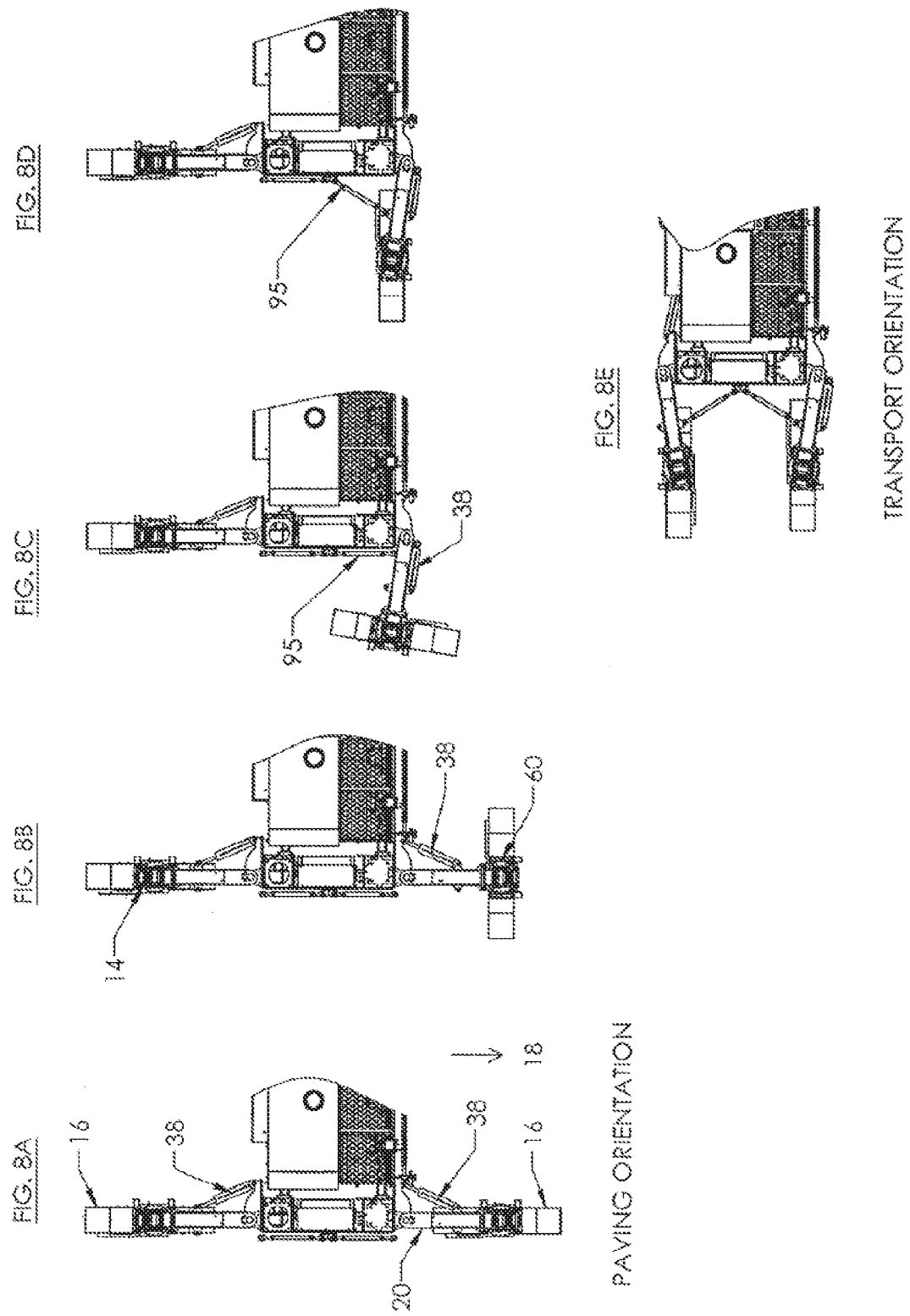
FIGS. 8A-E are schematic plan views of the paving machine which illustrate reconfiguring the machine into its transportation mode (or vice versa).

FIGS. 8A-E illustrate with more particularity how the paving machine of the present invention is readily, quickly and inexpensively reconfigured between its paving orientation shown in FIG. 8A or configuration for laying down the layer of concrete, and its transportation orientation shown in FIG. 8E or configuration in which the width of the machine is reduced to a roadway accepted width with minimal efforts.

As already mentioned, from time to time the paving machine must be reoriented, either at the work site for maneuvering or repositioning it around, or to ready the machine for transport to a different site, which requires loading the machine on a suitable trailer (not shown) and then hauling it to the new site over available roads.

Maneuvering the paving machine around the work site is accomplished by rotating the crawlers 16 relative to the jacking column 14 and then, or simultaneously therewith, activating the crawlers to move the machine into the desired position or to a given location at the site.

For loading the paving machine for transport to a different site on a trailer over standard highways, it is necessary to reduce the transport width of the paving machine to the maximum allowable width for highway vehicles. With the crawlers resting on the ground and initially facing in the paving direction 18, they are rotated 90° about the vertical jacking column axis with worm gear drive 60 into a position in which they are substantially transverse to the paving direction. The respective hydraulic actuators 38 keep the associated swing legs 20 in their paving orientation as seen in FIG. 8B. The ends of the hydraulic actuators 38 are then disconnected from the associated swing legs 20 by removing a pin, then with the crawler track on the ground, walking in an arc around the pivot shaft of the swing leg as shown in FIG. 8C. Once in this position, the crawlers are again rotated 90° about the vertical jacking column axis with worm gear drive 60 to place the swing legs in their transport orientation (shown in FIG. 8D) which is perpendicular to the paving direction. Finally, a turnbuckle 95 or like holding device is applied to the main frame side bolster of the paving machine and the swing legs to fix the latter in their transport orientation. This process is repeated at each corner of the machine until each swing leg and crawler track is in the transport orientation and the swing legs are in their transport orientation (FIG. 8E) and perpendicular to the paving direction (FIG. 8D).

With the earlier described, cooperating position transducers 70, angular transducer 78 (not shown in FIGS. 8A-E) and worm gear drive 60, or if desired manually, the crawlers 16 are thereby brought into alignment with the bolster swing legs, which, in the transport direction, are oriented perpendicular to the paving direction 18 and do not materially extend laterally past the remainder of the paving machine, so that the entire machine width is within permissible width limits for highway transportation. Once the crawler and the associated swing leg 20 are in their transport orientation, which preferably is slightly more than 90°, e.g. 95°, the tightened transportation turnbuckle 95 having its ends attached to the paving machine frame side bolster and the swing arm prevents movements of the swing leg and the crawler out of their transport orientation while the paving machine is moved to another site.

Thus, in the transport position the swing legs and crawlers are parallel to and extend past the respective lateral ends of the paving machine while the overall width is kept within width limits allowed for highway vehicles.

Placing the paving machine in the transport direction requires little time since the operation can be quickly performed and the crawlers can then be used to move the paving machine onto a trailer for transport to a different site without requiring heavy lifting equipment such as a crane to place the paving machine from the paving to the transport directions, and vice versa.

Figure 6:
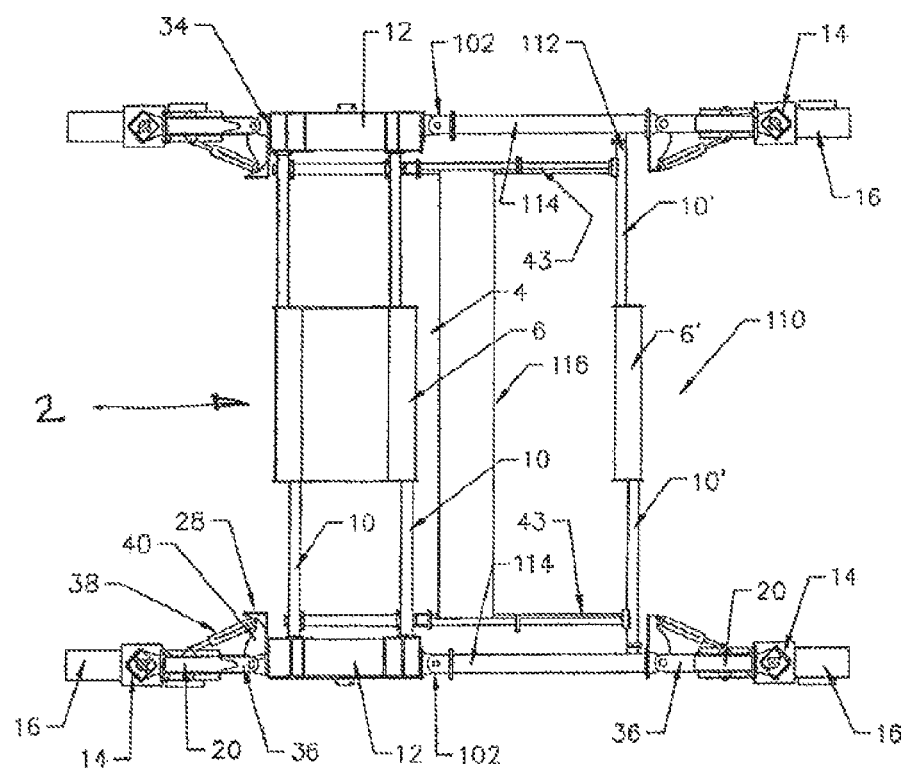
FIG. 6 is a schematic plan view similar to FIG. 2 and illustrates the attachment of the bolster swing legs to the aft portion of the paving machine, with the paving machine having an additional cross beam between the tractor frame and the swing legs for additional kits that may be mounted on the paving machine.

FIG. 6 shows a paving machine 2 including a center module 6, laterally extending support beams 10, side bolsters 12, jacking columns 14 and crawlers 16 as described above. The paving machine can be used, for example, with a dowel bar inserter 116 for intermittently inserting dowel bars (not shown) into the freshly laid down concrete strip immediately behind the paving kit. Such a dowel bar inserter, its construction and attachment to the paving machine are described, for example, in commonly owned, copending U.S. patent application Ser. No. 12/556,486, filed Sep. 9, 2009, for a Paver Having Dowel Bar Inserter With Automated Dowel Bar Feeder, the disclosure of which is incorporated herein by reference as if it were fully set forth herein.

To movably support the dowel bar inserter 116, for example, or another kit of the paving machine from the tractor frame, the lateral ends 112 of a cross beam 110 are tied into, that is, they are typically bolted to, rearwardly extending bolster extensions 114. The longitudinal support beams 43 for the dowel bar inserter shown (the rest of the dowel bar inserter is not shown) attach to the rear of the tractor frame by means of a mounting bracket attached to the support beam in the front and to the rear cross beam 110 in the rear. The forward ends of the bolster extensions 114 are secured to the rearwardly facing end surfaces of the main tractor frame bolsters 12 that can be provided with or without an additional bolt-in hinge 102. When no hinge in the bolster is provided, the bolster extension 114 must be removed prior to transporting the machine. Prior to removing the bolster extensions for loading and transporting the paver, the rear hinge 36 and swing leg 20 along with the jacking column 14 and crawler track 16 (the entire assembly) must be removed and then lifted and bolted to the rear of the main frame side bolster 12 and the paver put into the transport orientation. The weight of this entire swing leg, jacking column and crawler track assembly can be handled with a relatively small crane. When the bolster extension is provided with a bolt-in hinge 102, the bolster extension 114, swing leg, jacking column and crawler track can be left on the paving machine so that by hinging the bolsters into the outboard transport position, the paving machine is capable of self-loading onto a trailer, with the bolster, swing leg and jacking column with crawler track folded up for transport. The advantage of this is that no crane is required to remove the bolster extension in order to transport.

Figure 6A:
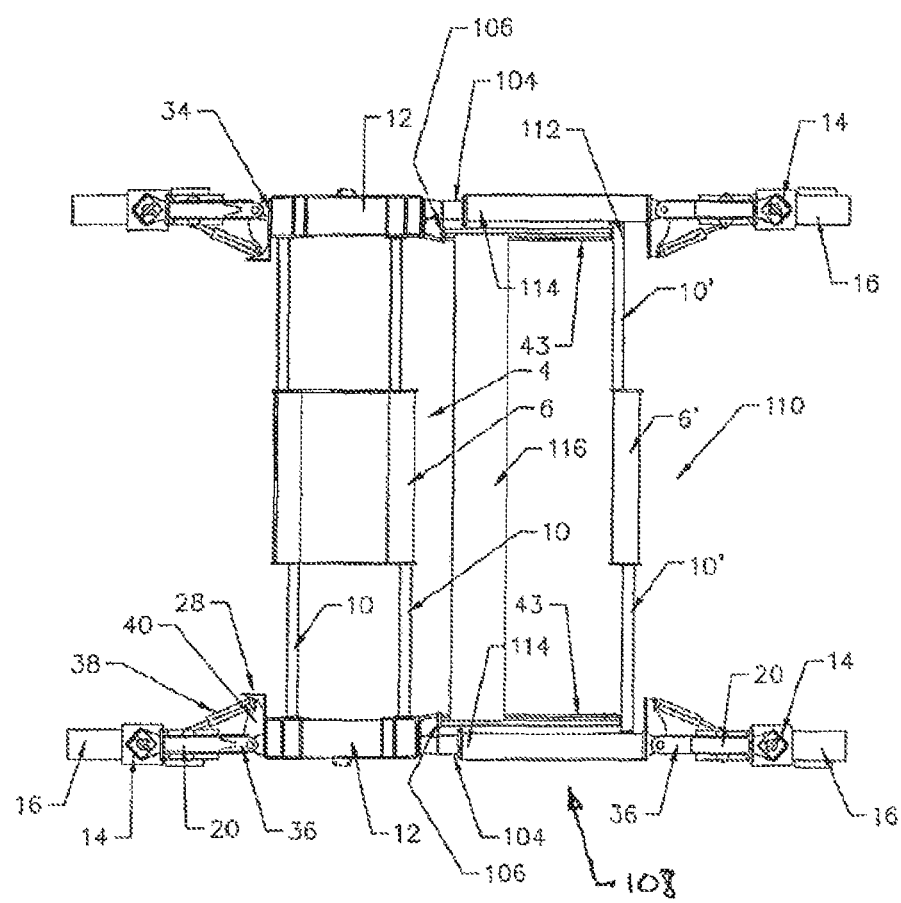
FIG. 6A shows in plan view a paving machine with a DBI Module incorporating special bolt-in short bolster extensions with built-in mounts for DBI longitudinal support beams.
Figure 6B:
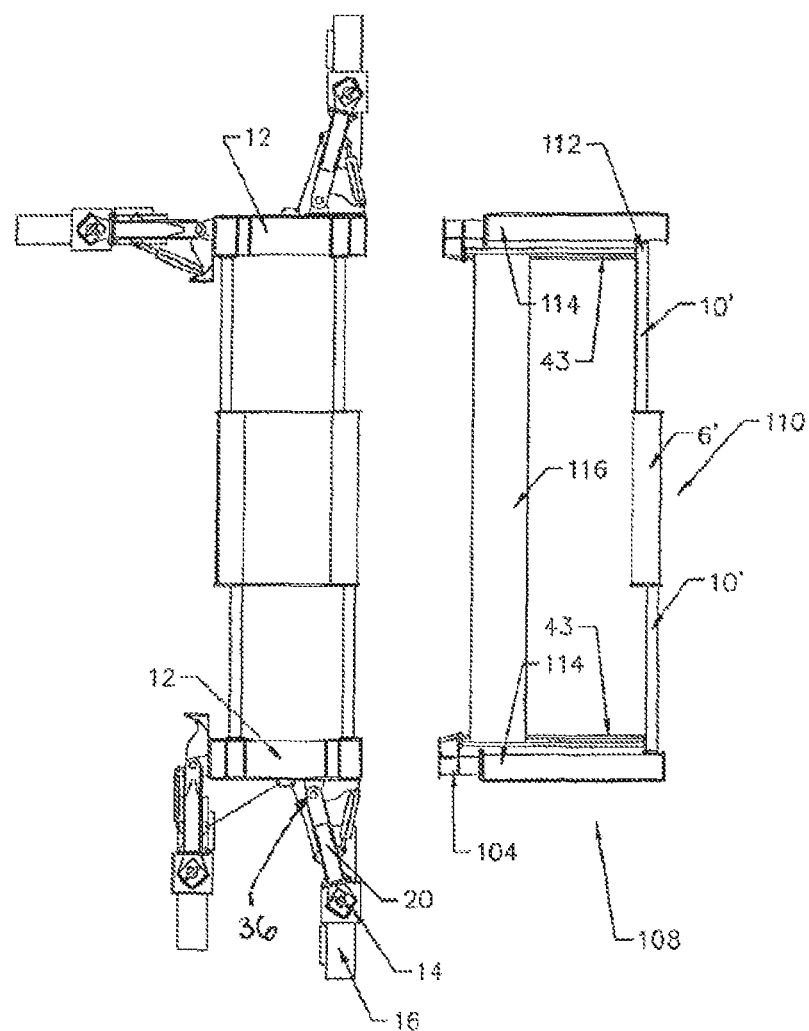
FIG. 6B is an illustration similar to FIG. 6A with the paving machine and the DBI shown in various relative positions as they are being readied for transportation while in their respective transport orientations.
Figure 6C:
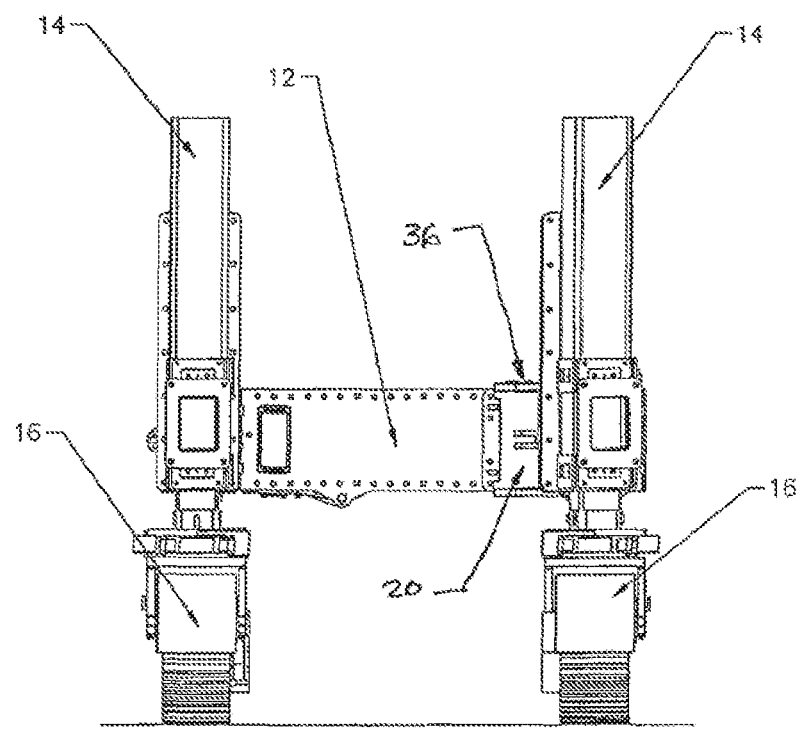
FIG. 6C is a side elevation of the paving machine shown in FIG. 6B, in its transport orientation.

A variation to the DBI mounting arrangement shown in FIG. 6 with a bolt-in hinge is the mounting arrangement shown in FIGS. 6A and 6B. Instead of a bolt-in hinge 102, a special bolt-in short bolster extension 104 with built-in mount 106 for the DBI longitudinal support beam 43 is supplied. Instead of the longitudinal support beams 43 attaching to the rear of the tractor frame by means of a mounting bracket described above, the longitudinal support beams mount to the bolster extension 104. When the bolster extension is provided with a special bolt-in short bolster extension 104 with built-in mount 106 for the DBI longitudinal support beam, a practical and fast loading/transport solution is possible for both the paver and the DBI, providing a medium-size crane readily available. Because the bolster extensions are tied to the DBI supporting longitudinal support beam 43 in this configuration and also to the rear cross beam 110, a rectilinear frame is formed where the DBI, complete with bolster extensions 114 and 104, becomes a kit (module) 108 of a legally transportable width. If this DBI Module is supported complete with bolter extensions 114 and 104, while it is still attached to the paver, the rear hinge 36 and swing leg 20 along with the jacking column and crawler track (the entire assembly), it can be lifted with a relatively light small crane (without disconnecting any of the hydraulic or electrical connections) and bolted to the side of the main frame side bolster 12, using the universal bolting pattern found on the side bolster 12 as shown in FIGS. 6B and 6C (that matches the hole pattern of the swing leg) covered and described in copending, commonly owned U.S. patent application Ser. No. 12/703,101, filed Feb. 9, 2010, for a Slipform Paving Machine With Adjustable Length Tractor Frame. This swing leg, jacking column and crawler track assembly is mounted in the transport orientation as shown in FIG. 6B and FIG. 6C. Once this procedure is completed on the opposite side of the machine, the complete DBI with bolster extensions 114 and 104 and the DBI Module 108 can be lifted as a module 108 on a truck transporting trailer. With the DBI Module 108 removed from the rear of the paver tractor frame, then the other front swing leg and jacking column with crawler track can be walked into the transport orientation as described herein. With all the swing legs and jacking columns with crawler tracks now in the transport orientation, the paver can self-load by walking onto a transporting trailer. The advantage of this arrangement is that if a medium-size crane is available, adding or removing the DBI Module 108 and unloading or loading the DBI Module and paver can be done very rapidly.

FIG. 6B schematically illustrates the paving machine and the DBI Module arranged for transport in two loads, as a crawler track paver module and as a DBI Module 108. The right and left rear jacking columns 14/crawler 16/swing leg 20/rear hinge 36 subassembly has been moved into its transport orientation as previously described. The left front jacking column/crawler/swing leg/rear hinge subassembly has been rotated towards its transport orientation, while the right front jacking column, crawler/swing leg/front hinge subassembly is shown in its paving orientation and must still be rotated into its transport orientation before the modules are ready for loading onto a trailer (not shown).

Cross beam 110 may comprise a non-telescoping or a telescoping cross beam, laterally extendable and retractable support system that has a female center housing 6' which movably receives male support beams 10' that extend in opposite directions from the center housing towards the rearward bolster extensions 76. The construction and operation of telescoping cross beam 110 and the kits, such as a dowel bar inserter kit suspended therefrom, are described in copending, commonly owned U.S. patent application Ser. No. 12/703,101, filed Feb. 9, 2010, for a Slipform Paving Machine With Adjustable Length Tractor Frame, the disclosure of which is incorporated herein by reference.

Expanding on the three-leg paver embodiments considered above, several configurations of paving machines having three leg with corresponding crawler tracks are considered below. As with four leg implementations of paving machines using swing legs, one or more legs of a three-leg paver can be a swing leg with a jacking column and crawler track. These swing legs can be coordinated electronically allowing ease of automatically or semi-automatically reconfiguring the machine to go into a transport position, an operational paving position, or to reposition jacking column and/or crawler track positions on the fly to avoid obstacles or severe grade deviations during paving. These adjustable swing legs can reduce the time required for switching the machine between the transport configuration and the operational paving configuration. Unlike traditional paver machines that implement leg adjustment using four-bar linkages or require stopping of the machine and time-consuming supporting the machine frame, hydraulically lifting the crawler track off the ground, then mechanically re-aligning the swing leg to the new position, hydraulically lowering the crawler track back on the ground then rotating the crawler track to the new desired position and resetting the electronics, the present disclosure provides for machines that can adjust leg and crawler track location while in operation ("on the fly"). In each of the three-leg paver embodiments considered herein, further particular advantages are obtained through use of at least one swing leg as part of a three-leg paving machine. In embodiments with two forward-mounted legs on the paving machine, these legs can be referred to as first and second legs, as appropriate.

In some aspects, three-leg paving machines as disclosed herein are capable of transitioning into a transport position while moving. While a paving machine is moving, it is capable of automatically going from a working position to the narrow and predetermined profile of the transport position, relocating the crawler tracks attached to jacking columns via slew drives and transducers attached the swing legs. The transducers can control adjustment via slew drives such that the crawler tracks are kept oriented straight ahead or at an angle to match the desired "tracking" of the crawlers to minimize or eliminate skidding. This predetermined transport position can take into account the position of the swing leg/jacking column with crawler tracks to avoid interfering with the auger conveyor or belt conveyor and the desired gauge of the crawler tracks in relationship to each other to match the width of the trailer bed on which the machine will be loaded. This predetermined position can be manually overridden or "jogged" to a fine tuning position. Generally, the transport position can be configured to be sufficiently narrow or aligned such that the tracks of the three-leg paving machine will fit onto the bed of a trailer for carrying the three-leg paving machine.

While the paving machine is moving, allowing automatic repositioning of one or more swing legs (inclusive of jacking column and crawler tracks) into new positions provides for the ability to avoid obstacles (e.g., manholes, guard rails, posts, etc.) or large changes in grade. The adjustment implemented by the transducers coupled to the swing leg and crawler tracks, and resolved by the onboard computer automatically, keeps the respective crawler tracks at optimum angles to reposition and proceed straight ahead once the new position is reached. In particular, three-leg implementations of the paving machine are capable of working on tight radius curves while moving. Such tight radius movement is employed for the slipform paving of concrete profiles such as curbs, including 90° turns (left or right) and 180° turns (e.g. a rounded end or U-turn at the end of a curb), or turns at increments of degree therein.

In other aspects, three-leg paving machines as disclosed herein can also transition into a transport position while stationary. This can be accomplished using a support under the tractor frame, hydraulically lifting one crawler track off the ground using a jacking column attached to a swing leg, and then using a hydraulic actuator or a mechanical turnbuckle to move the respective leg and crawler track to another position. Such adjustments can be done for all three legs of a three-leg paving machine one at a time or concurrently, automatically or semi-automatically, to prepare the paving machine jacking column(s) and crawler track position(s) for transport and to move to a predetermined transport position. Conversely, this process can also be applied to moving legs of a three-leg paver to a predetermined working position(s). As with adjustments made while the paving machine is in motion, this predetermined position can be manually overridden or jogged to fine tune or optimize the jacking column(s) and crawler track positions.

Similarly, a variation of tight radius curve paving is also provided for embodiments where the paving machine is stationary. Again, the machine frame can be supported and elevated via hydraulic lifting one crawler track off the ground, using the jacking column attached to the swing leg and moving the leg position with a hydraulic actuator or a mechanical turnbuckle, one at a time or concurrently, automatically or semi-automatically, to a predetermined position, stored in the memory of the onboard computer. In a stationary position, the paving machine can adjust to continue with paving different concrete profiles that require tight radius movement (such as curbs), including 90° through 180° turns, or turns at increments of degree therein.

Figure 9:
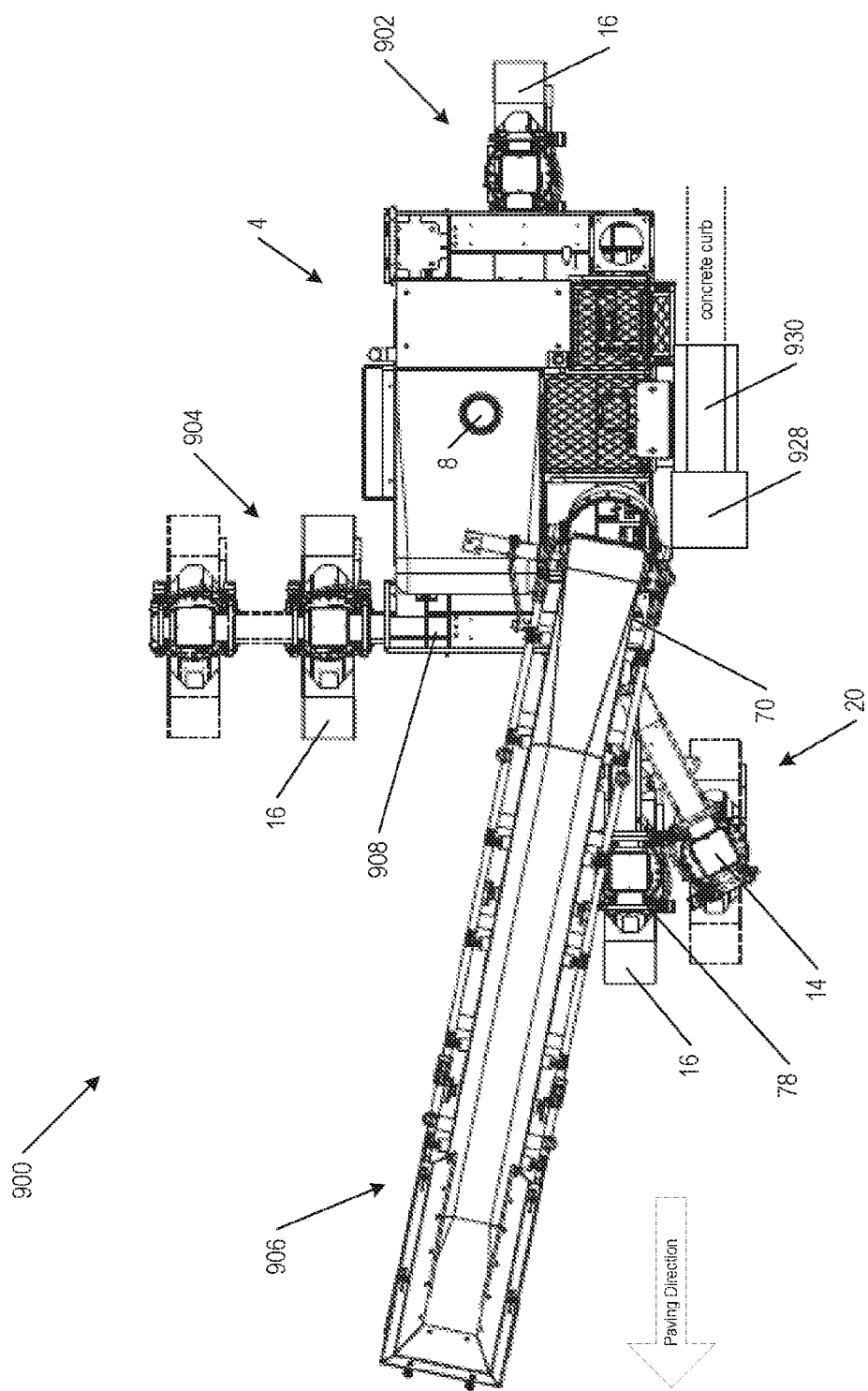
FIG. 9 is a plan view illustration of a three-leg paving machine having one forward swing leg, according to aspects of the disclosure.

At the end of a pour or paving up to an obstacle, once the paving machine is stationary, the slew drives between the crawler track and the jacking columns can allow the paver machine crawler tracks to all be turned 90° relative to the previous direction of travel, such that the paver machine can walk laterally. This can reduce the amount of manual forming needed when finishing paving for barrier wall or curbs and gutters. Once in this 90° degree mode position, the paving machine can walk and steer in the direction perpendicular to the prior working direction, and the new alignment of the front tracks will stay parallel with the new alignment of the rear crawler track to avoid skidding the crawler tracks. The 90° degree mode position can be a preset configuration saved within the onboard computer, responsive to orientation input from the swing leg and crawler track transducers FIG. 9 is a plan view illustration of a three-leg paving machine 900 having one forward swing leg 20 extending from tractor frame 4. Three-leg paving machine 900 further includes an aft leg 902 and a forward (laterally) telescoping leg 904 also extending from tractor frame 4. Each of the swing leg 20, aft leg 902, and forward telescoping leg 904 further include crawler tracks 16. Forward swing leg 20 can be further supported via a jacking column 14, providing a pivot location for movement of the forward swing leg 20. A conveyor 906 is connected to the tractor frame 4 which can convey concrete to a hopper 928, attached to a profile mold 930 for vibrating and shaping the concrete into a semi-solid state. Semi-solid concrete dumped in the hopper 928 of a profile mold 930 (e.g. a curb profile) attached to the underside or lateral side of the tractor frame, and through the profile mold 930, concrete can be laid down in a shaped form or profile, having an upward surface and lateral sides (e.g., formed as a curb). The concrete belt conveyor 906 is illustrative as one means of supplying concrete to the profile mold 930 and hopper 928; alternatively, a concrete auger conveyor or a conveyor mounted to another machine can deliver concrete to the hopper 928. An exemplary concrete curb is shown, formed from the profile mold 930, in accordance with the paving direction. Further, while hopper 928 and profile mold 930 are shown in FIG. 9 on the lateral side of tractor frame proximate to forward swing leg 20, it can be appreciated that in some embodiments, hopper 928 and profile mold 930 can be positioned on the lateral side of tractor frame proximate to forward laterally telescoping leg 904. In some embodiments, aft leg 902 is further laterally movable long the back end width of tractor frame 4.

FIG. 9 shows both forward swing leg 20 and forward telescoping leg 904 in a transport position (in solid line) relatively close in toward the tractor frame 4, and in an operational working position (in dashed line) relatively distant from the tractor frame. Forward swing leg 20 and forward telescoping leg 904 can be driven between transport and operational positions by power unit 8. As shown, forward telescoping leg 904 can be configured to extend and retract relative to the tractor frame 4 in a direction perpendicular to the direction of paving; in other words, perpendicular to the forward and aft ends of the tractor frame 4. As in other embodiments, swing leg 20 further includes cooperating position transducer 70 and angular transducer 78 which can relay movement data to an onboard computer, which can resolve the direction and orientation of swing leg 20 and its corresponding crawler track 16 as the three-leg paving machine 900 is in operation or being transported. In some aspects, forward telescoping leg 904 can also include an angular transducer 78 coupled to its crawler track 16. In combination with a known position of forward telescoping leg 904, tracked with a linear transducer 908, (which can be adjusted in width position via a hydraulic actuator, a linear actuator, or the like), the positions of forward swing leg 20 and forward telescoping leg 904 can be changed while the three-leg paving machine 900 is in motion, using data from the various transducers, and resolved by an onboard computer, to maintain crawler tracks 16 in needed orientations for forward motion, backward motion, and/or turning while minimizing skidding.

Figure 10A:
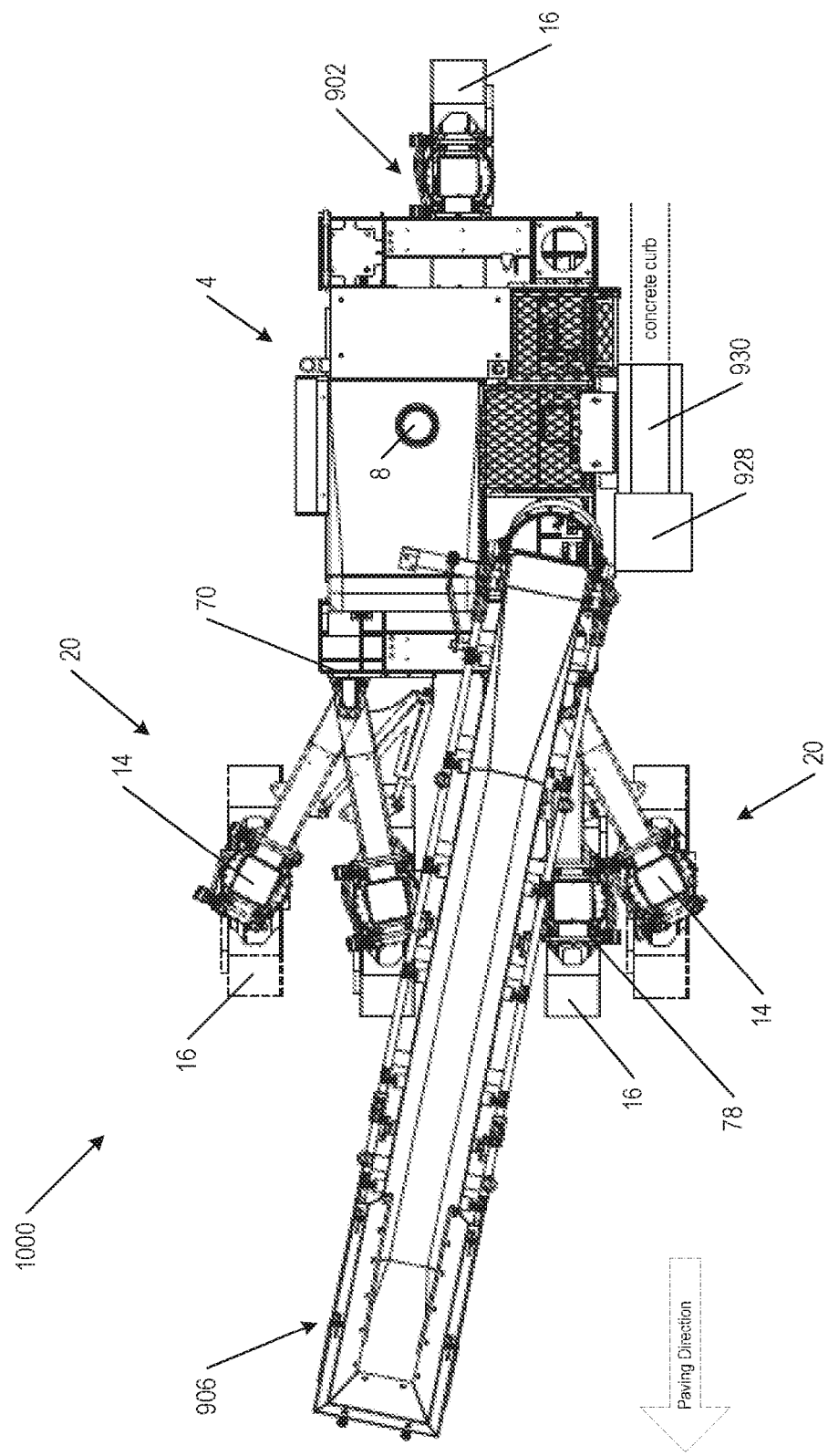
FIGS. 10A and 10B are plan view illustrations of a three-leg paving machine having two forward swing leg, according to aspects of the disclosure.
Figure 10B:
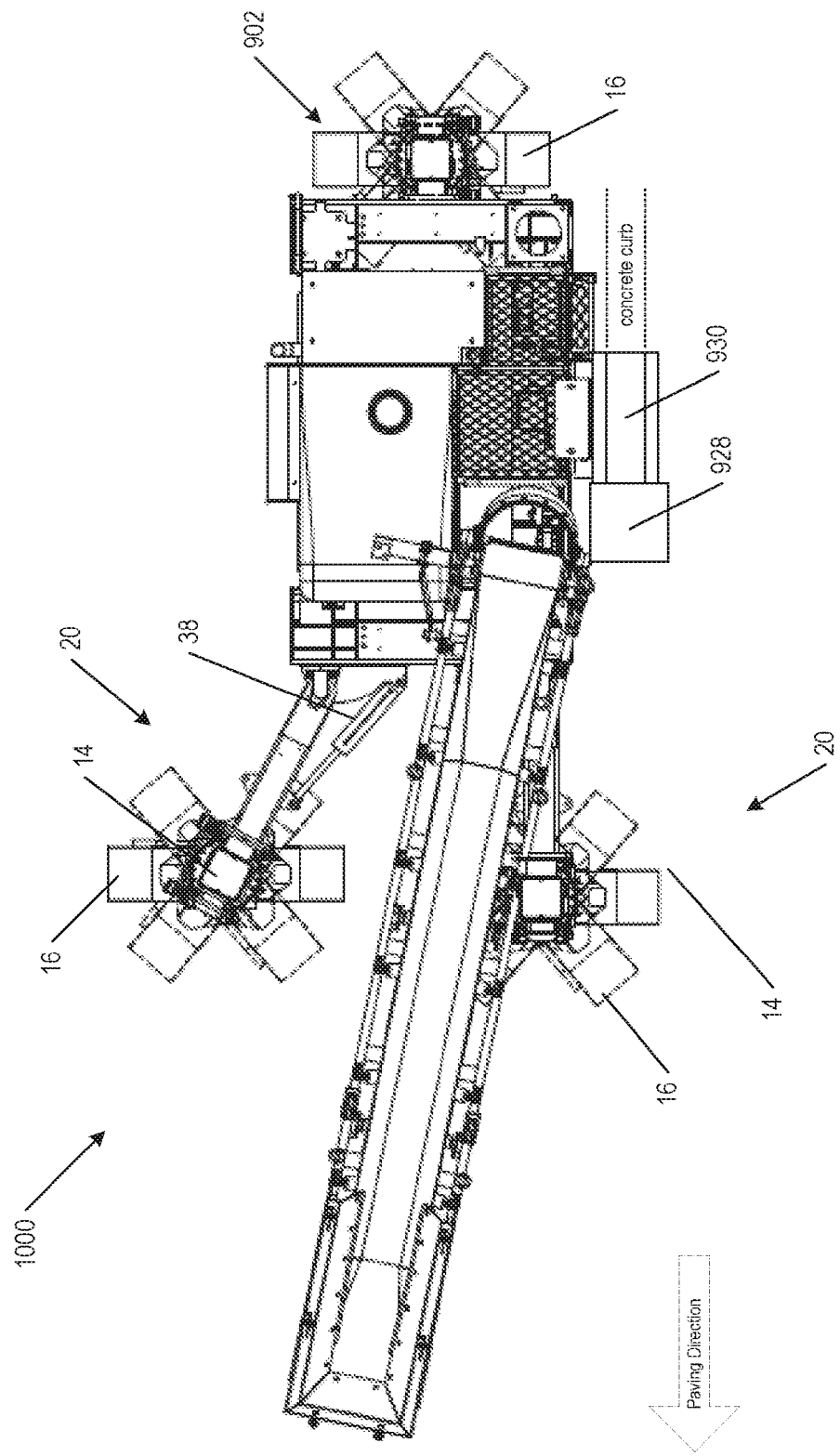

FIGS. 10A and 10B are plan view illustrations of a three-leg paving machine 1000 having two forward swing legs 20 extending from tractor frame 4. Three-leg paving machine 1000 further includes an aft leg 902 also extending from tractor frame 4. Each of the forward swing legs 20 and aft leg 902 further include crawler tracks 16. Forward swing legs 20 can each be further supported via separate jacking columns 14, providing respective pivot locations for movement of the forward swing legs 20. A conveyor 906 is connected to the tractor frame 4 which can convey concrete to a hopper 928, attached to a profile mold 930 for vibrating and shaping the concrete into a semi-solid state. Semi-solid concrete dumped in the hopper 928 of a profile mold 930 (e.g. a curb profile) attached to the underside or lateral side of the tractor frame, and through the profile mold 930, concrete can be laid down in a shaped form or profile, having an upward surface and lateral sides (e.g., formed as a curb). The concrete belt conveyor 906 is illustrative as one means of supplying concrete to the profile mold 930 and hopper 928; alternatively, a concrete auger conveyor or a conveyor mounted to another machine can deliver concrete to the hopper 928. An exemplary concrete curb is shown, formed from the profile mold 930, in accordance with the paving direction. It can be appreciated that hopper 928 and profile mold 930 can be positioned on either lateral side of tractor frame 4. In some embodiments, aft leg 902 is further laterally movable long the back end width of tractor frame 4.

FIG. 10A shows both forward swing legs 20 in a transport position (in solid line) relatively close in toward the tractor frame 4 (with a "narrow" or "inboard" profile), and in an operational working position (in dashed line) relatively distant from the tractor frame. Forward swing legs 20 can be driven between transport and operational positions by power unit 8. As in other embodiments, swing legs 20 both further include a cooperating position transducer 70 and an angular transducer 78 which can relay movement data for each independent leg to an onboard computer, which can resolve the direction and orientation of swing legs 20 and corresponding crawler tracks 16 as the three-leg paving machine 1000 is in operation or being transported. The positions of forward swing legs 20 can be changed while the three-leg paving machine 900 is in motion, using data from the various transducers, and resolved by an onboard computer, to maintain crawler tracks 16 in needed orientations for forward motion, backward motion, and/or turning while minimizing skidding.

FIG. 10B shows the rotatable range of crawler tracks 16 on each of the two forward swing legs 20 and the aft leg 902 on three-leg paving machine 1000. Hydraulic actuator 38 is further identified on one of the two forward swing legs 20 (the other hydraulic actuator for the complementary swing leg being occluded by conveyor 906), which can be used to control the position and range of motion of the swing leg 20. While hydraulic actuator 38 is shown connected to a front end of the tractor frame 4, in alternative aspects, hydraulic actuators 38 can be connected to either forward swing leg 20 from either the front end or lateral sides of the tractor frame 4. In further alternative aspects, slew drives can be used to control the position and range of motion of the swing legs 20.

Figure 11:
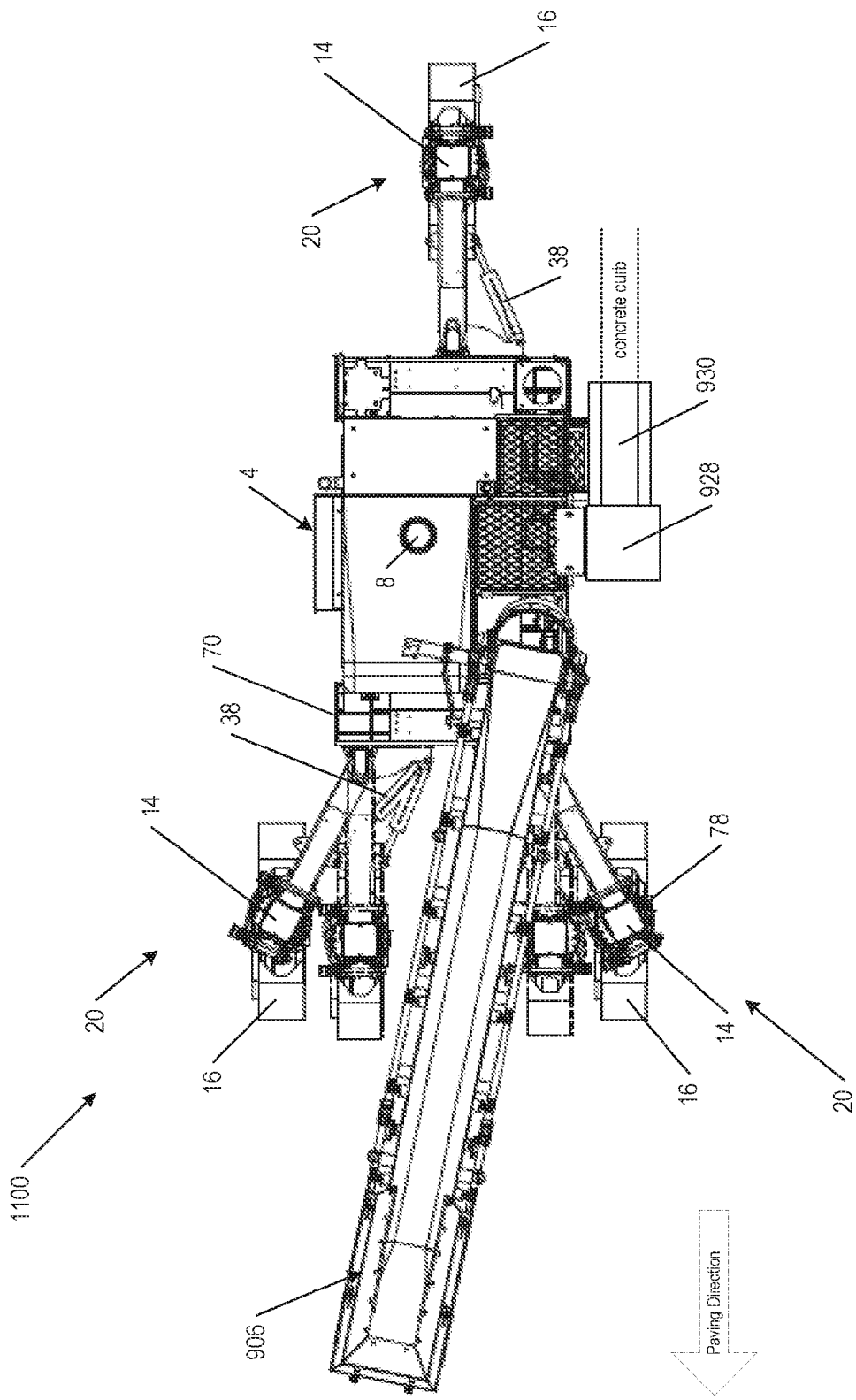
FIG. 11 is a plan view illustration of a three-leg paving machine having two forward swing leg and an aft swing leg, according to aspects of the disclosure.

FIG. 11 is a plan view illustration of a three-leg paving machine 1100 having two forward swing leg 20 and an aft swing leg 20 extending from tractor frame 4. All three of the swing legs 20, forward and aft, further include crawler tracks 16. All three of the swing legs 20, forward and aft, can each be further supported via separate jacking columns 14, providing respective pivot locations for movement of the swing legs 20. A conveyor 906 is connected to the tractor frame 4 which can convey concrete to a hopper 928, attached to a profile mold 930 for vibrating and shaping the concrete into a semi-solid state. Semi-solid concrete dumped in the hopper 928 of a profile mold 930 (e.g. a curb profile) attached to the underside or lateral side of the tractor frame, and through the profile mold 930, concrete can be laid down in a shaped form or profile, having an upward surface and lateral sides (e.g., formed as a curb). The concrete belt conveyor 906 is illustrative as one means of supplying concrete to the profile mold 930 and hopper 928; alternatively, a concrete auger conveyor or a conveyor mounted to another machine can deliver concrete to the hopper 928. An exemplary concrete curb is shown, formed from the profile mold 930, in accordance with the paving direction. It can be appreciated that hopper 928 and profile mold 930 can be positioned on either lateral side of tractor frame 4.

FIG. 11 shows both forward swing legs 20 in an operational working position (in solid line) relatively distal from the tractor frame 4, and in a transport position (in dashed line) relatively proximate to the tractor frame. All swing legs 20 can be driven between transport and operational positions by power unit 8. As in other embodiments, swing legs 20 each further include a cooperating position transducer 70 and an angular transducer 78 which can relay movement data for each independent leg to an onboard computer, which can resolve the direction and orientation of swing legs 20 and corresponding crawler tracks 16 as the three-leg paving machine 1100 is in operation or being transported. The positions of all three of the swing legs 20 can be changed while the three-leg paving machine 1100 is in motion, using data from the various transducers, and resolved by an onboard computer, to maintain crawler tracks 16 in needed orientations for forward motion, backward motion, and/or turning while minimizing skidding. Hydraulic actuators 38 on each swing leg 20 (one of which being occluded by conveyor 906), can be used to control the position and range of motion of the respective swing legs 20.

Figure 12A:
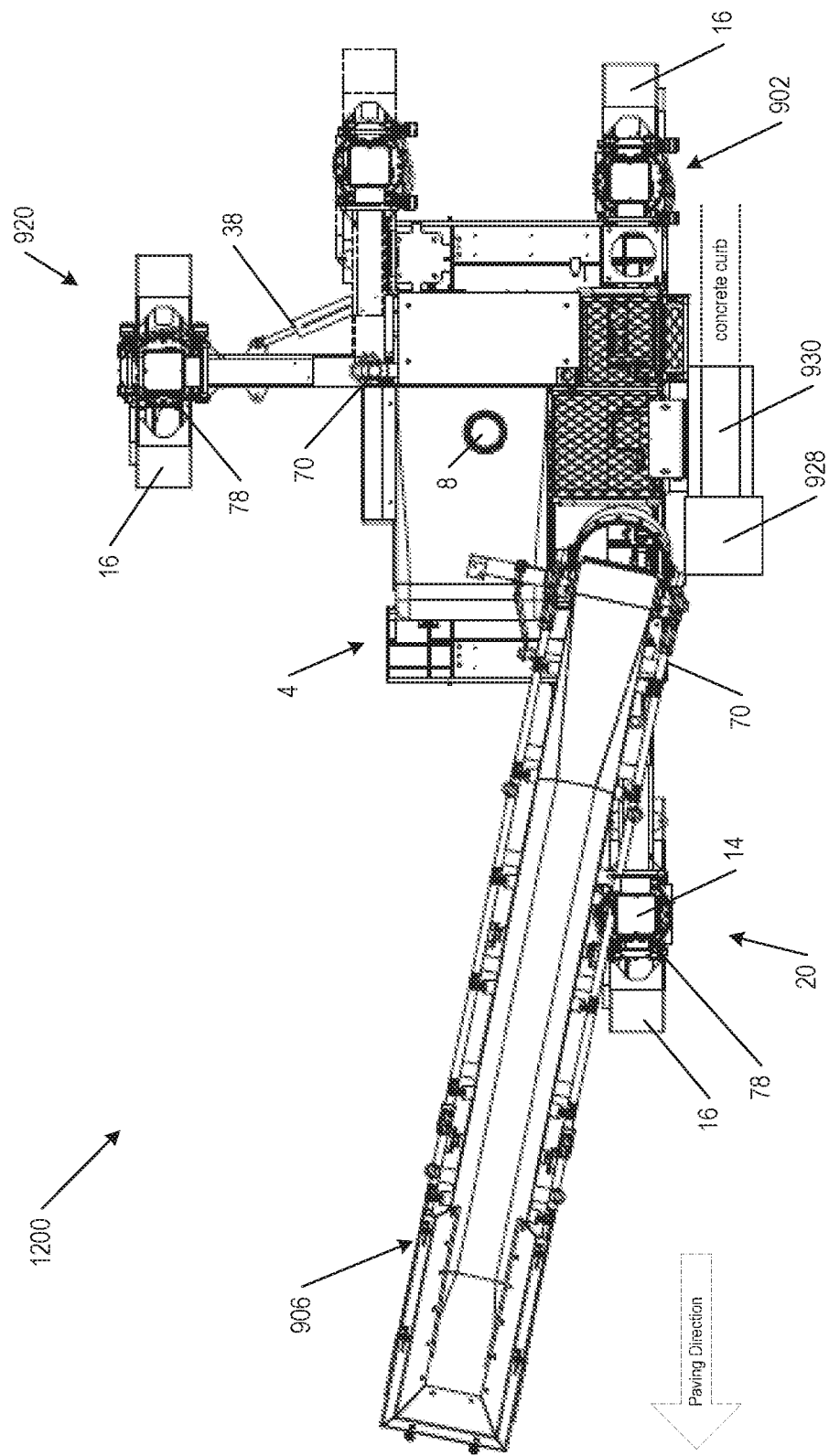
FIGS. 12A and 12B are plan view illustrations of a three-leg paving machine having one forward swing leg and one side swing leg, according to aspects of the disclosure.
Figure 12B:
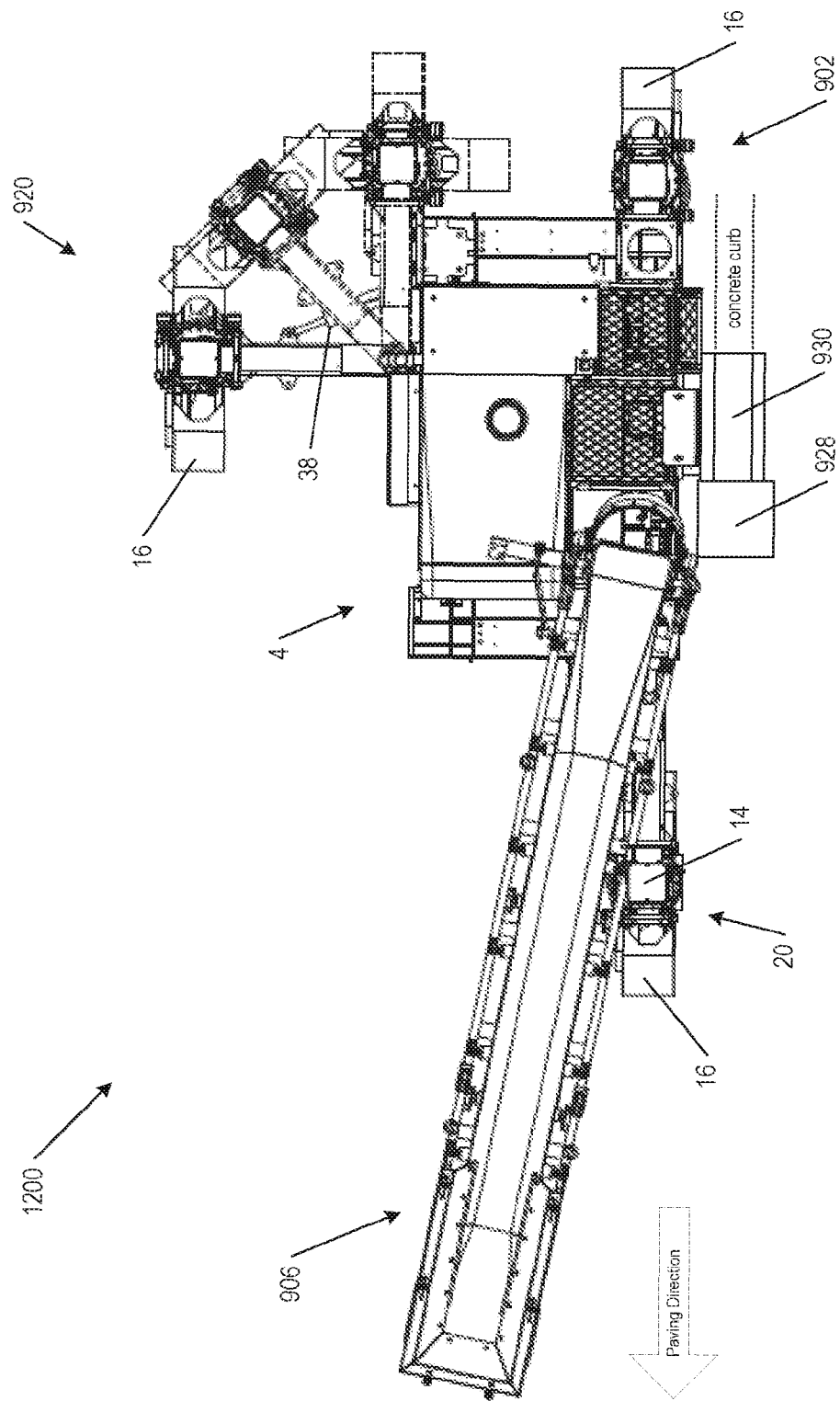

FIGS. 12A and 12B are plan view illustrations of a three-leg paving machine 1200 having one forward swing leg 20 and one side swing leg 920 extending from tractor frame 4. Three-leg paving machine 1200 further includes an aft leg 902 also extending from tractor frame 4. Each of forward swing leg 20, side swing leg 920, and aft leg 902 further include crawler tracks 16. Forward swing leg 20 and side swing leg 920 can each be further supported via separate jacking columns 14, providing respective pivot locations for movement of the forward swing legs 20. A conveyor 906 is connected to the tractor frame 4 which can convey concrete to a hopper 928, attached to a profile mold 930 for vibrating and shaping the concrete into a semi-solid state. Semi-solid concrete dumped in the hopper 928 of a profile mold 930 (e.g. a curb profile) attached to the underside or lateral side of the tractor frame, and through the profile mold 930, concrete can be laid down in a shaped form or profile, having an upward surface and lateral sides (e.g., formed as a curb). The concrete belt conveyor 906 is illustrative as one means of supplying concrete to the profile mold 930 and hopper 928; alternatively, a concrete auger conveyor or a conveyor mounted to another machine can deliver concrete to the hopper 928. It can be appreciated that hopper 928 and profile mold 930 can be positioned on either lateral side of tractor frame 4, where the side swing leg 920 is positioned on the lateral side of tractor frame 4 opposite of the hopper 928 and profile mold 930. In some embodiments, aft leg 902 is further laterally movable long the back end width of tractor frame 4.

FIG. 12A shows both side swing 920 (alternatively referred to as an outboard or a lateral leg) in an operational working position (in solid line) relatively close in toward the tractor frame 4, and in a transport position (in dashed line) relatively distant from the tractor frame 4. Forward swing leg 20 and side swing leg 920 can be driven between transport and operational positions by power unit 8. As in other embodiments, forward swing leg 20 and side swing leg 920 both further include a cooperating position transducer 70 and an angular transducer 78 which can relay movement data for each independent leg to an onboard computer, which can resolve the direction and orientation of forward swing leg 20 and side swing leg 920 and corresponding crawler tracks 16 as the three-leg paving machine 1200 is in operation or being transported. The positions of forward swing leg 20 and side swing leg 920 can be changed while the three-leg paving machine 1200 is in motion, using data from the various transducers to maintain crawler tracks 16 in needed orientations for forward motion, backward motion, and/or turning while minimizing skidding.

FIG. 12B shows a range of motion for side swing leg transitioning between an operational working position and a transport position. Hydraulic actuator 38 can which can be used to control the position and range of motion of the side swing leg 920. For example, as shown, the side swing leg 920 can be moved from a position aligned and proximate to the rear end of the tractor frame 4 to a position extending outward from a lateral side of the tractor frame, perpendicular to the direction of movement of the three-leg paving machine 1200. In other words, side swing leg 920 is capable of adjusting its orientation to 90° from its initial position. In further aspects, one or more hydraulic actuators 38 can be configured to move side swing leg 920 to a position aligned and proximate to the front end of the tractor frame 4. In other words, side swing leg 920 is capable of adjusting its orientation to 180° from its initial position. As in other embodiments, the crawler tracks 16 on each of the legs of the three-leg paving machine 1200 can be rotated as needed for movement and directional control. It should be appreciated that the movement of side swing leg 920 from one configuration to another can be rapid, accomplished when stationary.

While in the embodiments considered above, hopper 928 and profile mold 930 are shown positioned on a lateral side of the respective tractor frames 4, it is appreciated that in alternative embodiments, a profile mold 930 and variation of the hopper 928 can be positioned on the underside of the tractor frame, thus laying down a form or profile of concrete that passes under the aft end of the tractor frame. In such embodiments, a respective aft leg can be moved or adjusted such that the aft leg does not interfere with or run into the concrete profile.

Figure 13A:
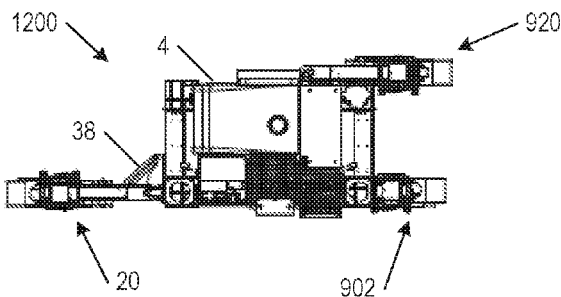
FIGS. 13A-E are plan view illustrations showing reconfiguration of a three-leg paving machine, according to aspects of the disclosure.
Figure 13B:
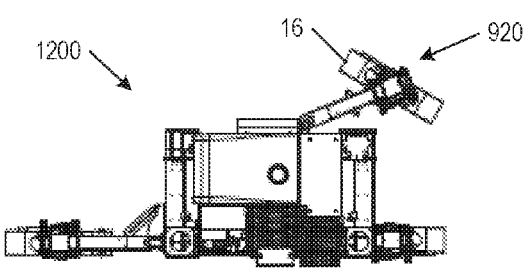

FIGS. 13A-E are plan view illustrations showing reconfiguration of a three-leg paving machine 1200 having a side swing leg 920 (the conveyor 906 not shown). In particular, the gradual reconfiguration of the three-leg paving machine 1200 having a side swing leg 920 is shown. Starting with FIG. 13A, the three-leg paving machine 1200 is in a transport position, with side swing leg 920 close-in with the main body of the tractor frame 4, relatively aligned with the aft leg 902. Forward swing leg 20 (having a hydraulic actuator 38) is also shown in a default transport position. In FIG. 13B, side swing leg 920 is shown in a first transitional position, moving outward from the tractor frame 4, and with its respective crawler track 16 pointing outward in the same direction that the side swing leg 920 is moving toward. The rotation of the appropriate crawler track 16 allows for the side swing leg 920 adjustment to occur while the three-leg paving machine 1200 is moving (and thus also while paving) without causing significant skidding of the crawler track 16 or shuddering/vibration of the tractor frame 4 that would otherwise disrupt the laying down of concrete.

Figure 13C:
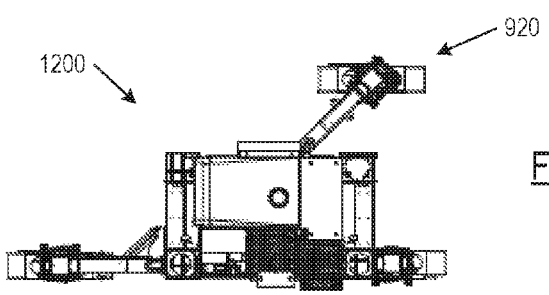

In FIG. 13C, side swing leg 920 is shown in an intermediary position, a set distance away from the tractor frame 4, and with its respective crawler track 16 pointing straight ahead in the same direction of the motion three-leg paving machine 1200. Three-leg paving machine 1200 can operate in this configuration, for example, to work around an obstacle that the corresponding crawler track 16 would otherwise run into. Similarly, this configuration can be a step in the process of a complete extension or readjustment to a working position of side swing leg 920. Again, this adjustment and phase of operation allows for the three-leg paving machine 1200 is moving (and thus also while paving) without causing significant skidding of the crawler track 16 or shuddering/vibration of the tractor frame 4 that would otherwise disrupt the laying down of concrete.

Figure 13D:
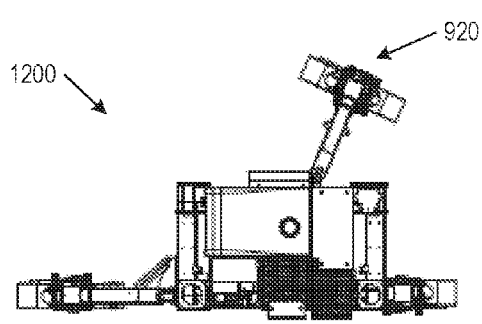
Figure 13E:
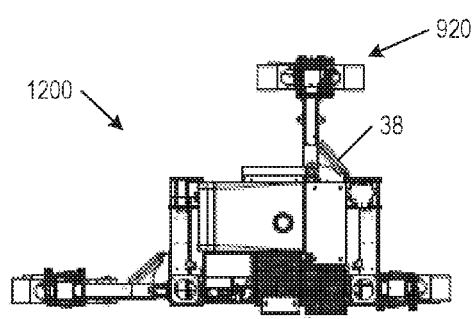

In FIG. 13D, side swing leg 920 is shown in a second transitional position, moving further outward from the tractor frame 4, and with its respective crawler track 16 pointing outward in the same direction that the side swing leg 920 is moving toward. Finally, in FIG. 13E, the side swing leg 920 is shown in a working operational position, at its full distance away from the tractor frame 4, with its crawler track 16 aligned with the other two crawler tracks 16 of three-leg paving machine 1200.

From the foregoing, it will be appreciated that specific embodiments of the invention have been described herein for purposes of illustration, but that various modifications may be made without deviating from the spirit and scope of the various embodiments of the invention. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the recited claims.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements. Further any specific numbers noted herein are only examples; alternative implementations may employ differing values or ranges, and can accommodate various increments and gradients of values within and at the boundaries of such ranges.

References throughout the foregoing description to features, advantages, or similar language do not imply that all of the features and advantages that may be realized with the present technology should be or are in any single embodiment of the invention. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment.

Furthermore, the described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology.

What is claimed is:

1. A paving machine configured to move in a paving direction for laying concrete into a molded form, having a generally upwardly exposed concrete surface and terminating in lateral concrete sides, the paving machine comprising:
    a center module having a forward end, an aft end, and lateral sides;
    a forward bolster connected to the forward end of the center module;
    an aft bolster connected to the aft end of the center module;
    a first crawler track and a second crawler track mechanically coupled to the forward bolster and a third crawler track mechanically coupled to the aft bolster;
    the forward bolster having a first swing leg, an upright first jacking column secured to the first swing leg, and a rotary connection between the first jacking column and the first crawler track permitting relative rotational movements of the first crawler track and the first jacking column about an upright axis; and
    a first power drive between the first jacking column and the first crawler track of the first swing leg, configured for translating relative rotational movements between the first jacking column and the first crawler track.

2. A paving machine according to claim 1 further comprising:
    a hinge bracket interposed between the first swing leg and an associated surface of the forward bolster;
    an upright pivot shaft that engages the first swing leg that permits pivotal movements of the first swing leg relative to the hinge bracket about an upright axis in a substantially horizontal plane, the hinge bracket including a pivot connection point that is laterally spaced from the pivot shaft; and a hydraulic actuator mounted on the hinge bracket, arranged to control the pivoting of the first swing leg relative to the center module.

3. A paving machine according to claim 2 further comprising:

a first angular position transducer between the first jacking column and first crawler track, emitting a first position signal which is indicative of an angular orientation of the first crawler track relative to the first jacking column;

a second angular position transducer between the first swing leg and the hinge bracket, emitting a second signal which is indicative of the angular orientation of the first swing leg relative to the hinge bracket; and a processor receiving the first signal and second signal and emitting a control signal for activating the first power drive and thereby rotationally moving the first crawler track relative to the first jacking column for keeping the first crawler track oriented in the paving direction in response to changes of the first signal caused by pivotal motions of the first swing leg about the pivot shaft.

4. A paving machine according to claim 1 wherein the first power drive further comprises a first helical worm gear drive and a second helical worm gear drive, diametrically opposed, wherein the first and second helical worm gear drives engage and drive a ring gear disposed between them.

5. A paving machine according to claim 3, wherein the first power drive further comprises a slew gear drive, configured to receive the control signal and maintain the first crawler track in the paving direction.

6. A paving machine according to claim 3 including a feedback for maintaining an orientation for each of the first, second, and third crawler tracks at predetermined positions independently of angular inclinations of the first, second, and third crawler tracks relative to either the forward or aft bolsters.

7. A paving machine according to claim 6 including a feedback loop operatively coupled to the first swing leg and the first crawler track for angularly repositioning the first crawler track relative to the first swing leg in response to angular motions of the first swing leg about the pivot connection, thereby keeping the first crawler track oriented in a travel direction.

8. A paving machine according to claim 1, wherein the forward bolster is mechanically coupled to a laterally telescoping leg, configured to extend from the center module in a direction perpendicular to the forward end, wherein the second crawler track is mechanically coupled to the laterally telescoping leg via an upright second jacking column, and further comprising:

an angular position transducer between the second jacking column and second crawler track, emitting a first position signal which is indicative of an angular orientation of the second crawler track relative to the second jacking column;

a linear position transducer between the laterally telescoping leg and the forward bolster, emitting a second signal which is indicative of the position of the laterally telescoping leg relative to the center module; and a processor receiving the first signal and second signal and emitting a control signal for maintaining the first crawler track and the second crawler track as oriented in the paving direction in response to changes of the first signal caused by motions of either the first swing leg or the laterally telescoping leg relative to the center module.

9. A paving machine according to claim 1, wherein the forward bolster is mechanically coupled to a second swing leg, an upright second jacking column secured to the second swing leg, and a rotary connection between the second jacking column and the second crawler track permitting relative rotational movements of the second crawler track and the second jacking column about an upright axis, and wherein the second swing leg further includes a second power drive between the second jacking column and the second crawler track, configured for translating relative rotational movements between the second jacking column and the second crawler track.

10. A paving machine according to claim 9 further comprising:

a hinge bracket interposed between the second swing leg and an associated surface of the forward bolster;

an upright pivot shaft that engages the second swing leg that permits pivotal movements of the second swing leg relative to the hinge bracket about an upright axis in a substantially horizontal plane, the hinge bracket including a pivot connection point that is laterally spaced from the pivot shaft; and a hydraulic actuator mounted on the hinge bracket, arranged to control the pivoting of the second swing leg relative to the center module.

11. A paving machine according to claim 10 further comprising:

a first angular position transducer between the second jacking column and the second crawler track, emitting a first position signal which is indicative of an angular orientation of the second crawler track relative to the second jacking column;

a second angular position transducer between the second swing leg and the hinge bracket, emitting a second signal which is indicative of the angular orientation of the second swing leg relative to the hinge bracket; and a processor receiving the first signal and second signal and emitting a control signal for activating the second power drive and thereby rotationally moving the second crawler track relative to the second jacking column for keeping the second crawler track oriented in the paving direction in response to changes of the first signal caused by pivotal motions of the second swing leg about the pivot shaft.

12. A paving machine according to claim 11 further comprising:

a feedback for maintaining an orientation of the first crawler track and the second crawler track relative to each other independently of angular inclinations of the first and second crawler tracks relative to the forward and aft bolsters; and a feedback loop operatively coupled to the second swing leg and the second crawler track for angularly repositioning the second crawler track relative to the second swing leg in response to angular motions of the second swing leg about the pivot connection, thereby keeping the second crawler track oriented in the paving direction.

13. A paving machine according to claim 1, wherein the aft bolster is mechanically coupled to an aft swing leg, an upright aft jacking column secured to the aft swing leg, and a rotary connection between the aft jacking column and the third crawler track permitting relative rotational movements of the third crawler track and the aft jacking column about an upright axis, and wherein the aft swing leg further includes a third power drive between the aft jacking column and the third crawler track, configured for translating relative rotational movements between the aft jacking column and the third crawler track.

14. A paving machine according to claim 1 further comprising:
- a conveyor arranged to deliver semi-solid concrete to a hopper;
- the hopper arranged to receive and vibrate semi-solid concrete; and
- a profile mold, arranged to receive semi-solid concrete from the hopper and configured to lay down concrete in a shaped form.

15. A paving machine according to claim 1, further wherein at least one of:
- the first swing leg is laterally and movably connected to the forward bolster, the paving machine further comprises a second swing leg that is laterally and movably connected to the forward bolster, or the paving machine further comprises an aft swing leg that is laterally and movably connected to the aft bolster.

\* \* \* \* \*

(12) INTER PARTES REVIEW CERTIFICATE (3653rd)
United States Patent
Guntert, Jr. et al.

(10) Number: US 9,908,571 K1
(45) Certificate Issued: Jul. 17, 2024

(54) ADJUSTABLE BOLSTER SWING LEGS FOR SLIPFORM PAVING MACHINES

(71) Applicants: Ronald M. Guntert, Jr.; Gerald L. Dahlinger; Richard Wood Francis

(72) Inventors: Ronald M. Guntert, Jr.; Gerald L. Dahlinger; Richard Wood Francis

(73) Assignee: GUNTERT & ZIMMERMAN CONST. DIV., INC.

Trial Number:

IPR2021-00136 filed Nov. 6, 2020

Inter Partes Review Certificate for:

Patent No.: 9,908,571
Issued: Mar. 6, 2018
Appl. No.: 15/623,012
Filed: Jun. 14, 2017

The results of IPR2021-00136 are reflected in this inter partes review certificate under 35 U.S.C. 318(b).

INTER PARTES REVIEW CERTIFICATE
U.S. Patent 9,908,571 K1
Trial No. IPR2021-00136
Certificate Issued Jul. 17, 2024

AS A RESULT OF THE INTER PARTES REVIEW PROCEEDING, IT HAS BEEN DETERMINED THAT:

Claims 1-15 are cancelled.

\* \* \* \* \*